(12) United States Patent
Hirano

(10) Patent No.: US 11,550,978 B2
(45) Date of Patent: Jan. 10, 2023

(54) CIRCUIT DESIGN ASSISTANCE SYSTEM AND COMPUTER READABLE MEDIUM

(71) Applicant: MITSUBISHI ELECTRIC CORPORATION, Tokyo (JP)

(72) Inventor: Susumu Hirano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/223,466

(22) Filed: Apr. 6, 2021

(65) Prior Publication Data

US 2021/0224448 A1  Jul. 22, 2021

Related U.S. Application Data

(63) Continuation of application No. PCT/JP2018/046308, filed on Dec. 17, 2018.

(51) Int. Cl.
*G06F 30/327* (2020.01)
*G06F 30/3312* (2020.01)
*G06F 119/12* (2020.01)

(52) U.S. Cl.
CPC ........ *G06F 30/327* (2020.01); *G06F 30/3312* (2020.01); *G06F 2119/12* (2020.01)

(58) Field of Classification Search
USPC ....................................................... 716/104
See application file for complete search history.

(56) References Cited

U.S. PATENT DOCUMENTS

| | | |
|---|---|---|
| 5,416,718 A | 5/1995 | Yamazaki |
| 6,145,116 A | 11/2000 | Tawada |
| 2004/0216069 A1 | 10/2004 | Fujita et al. |
| 2008/0250379 A1 | 10/2008 | Takaoka et al. |
| 2010/0169675 A1 | 7/2010 | Kajihara |
| 2012/0223768 A1 | 9/2012 | Higuchi |
| 2014/0089884 A1 | 3/2014 | Ikenishi |
| 2015/0117126 A1 | 4/2015 | Higuchi |
| 2015/0161322 A1 | 6/2015 | Yoshino |

FOREIGN PATENT DOCUMENTS

| | | |
|---|---|---|
| JP | 61-120516 A | 6/1986 |
| JP | 4-287512 A | 10/1992 |
| JP | 4-287963 A | 10/1992 |
| JP | 5-67169 A | 3/1993 |
| JP | 5-191226 A | 7/1993 |
| JP | 9-293094 A | 11/1997 |
| JP | 2000-68381 A | 3/2000 |
| JP | 2002-157293 A | 5/2002 |
| JP | 2004-280439 A | 10/2004 |
| JP | 2004-327864 A | 11/2004 |

(Continued)

OTHER PUBLICATIONS

International Search Report (PCT/ISA/210) issued in PCT/JP2018/046308 dated Mar. 5, 2019.

*Primary Examiner* — Mohammed Alam

(74) *Attorney, Agent, or Firm* — Birch, Stewart, Kolasch & Birch, LLP

(57) ABSTRACT

A detection unit (231) detects, based on synthesis result data obtained by logic synthesis on design data of a target circuit, a predicted place where a glitch is predicted to occur in the target circuit. An insertion unit (232) inserts a glitch removal circuit in an output side of the predicted place by making a change to at least one of the synthesis result data and the design data.

3 Claims, 20 Drawing Sheets

(56) References Cited

FOREIGN PATENT DOCUMENTS

| | | |
|---|---|---|
| JP | 2006-235889 A | 9/2006 |
| JP | 2008-20986 A | 1/2008 |
| JP | 2008-140061 A | 6/2008 |
| JP | 2008-305132 A | 12/2008 |
| JP | 2010-21950 A | 1/2010 |
| JP | 2010-154294 A | 7/2010 |
| JP | 2010-271853 A | 12/2010 |
| JP | 2012-182622 A | 9/2012 |
| JP | 2014-67222 A | 4/2014 |
| JP | 2015-114730 A | 6/2015 |
| JP | 2018-142235 A | 9/2018 |

Fig. 5
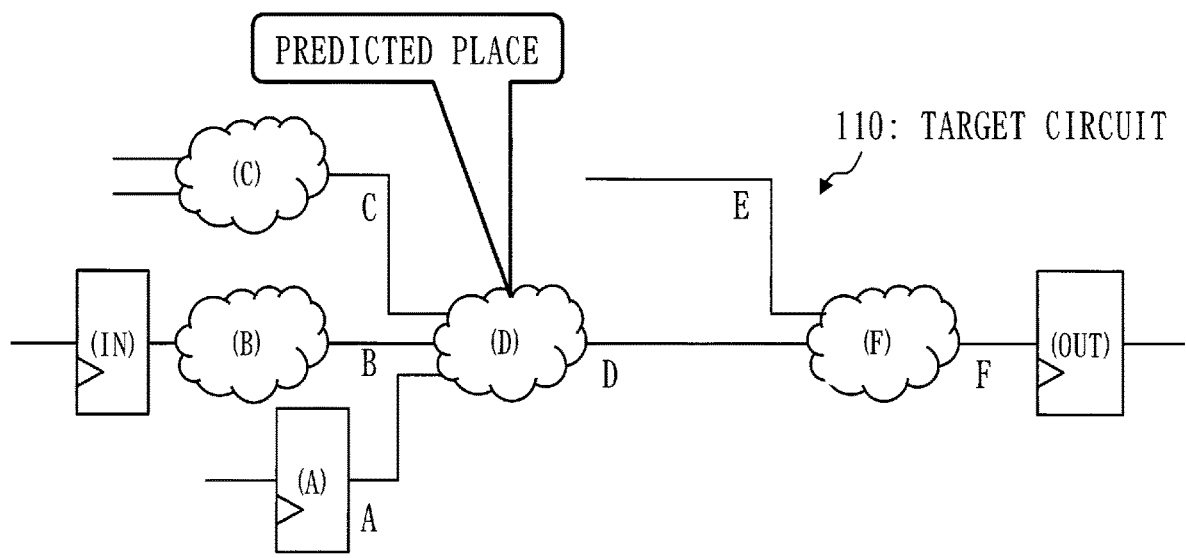
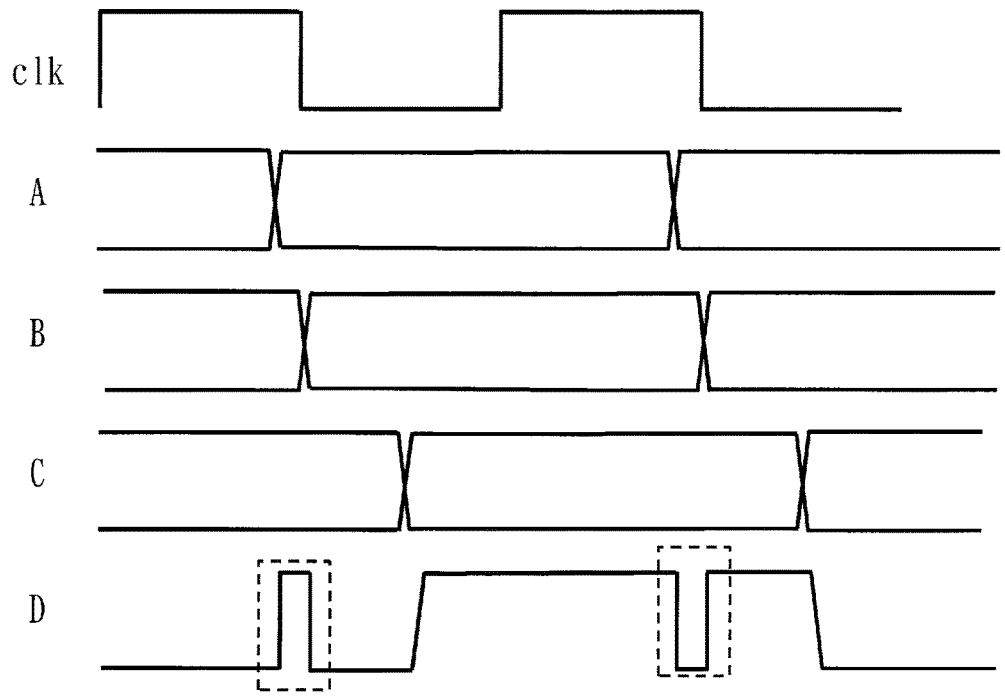

Fig. 6
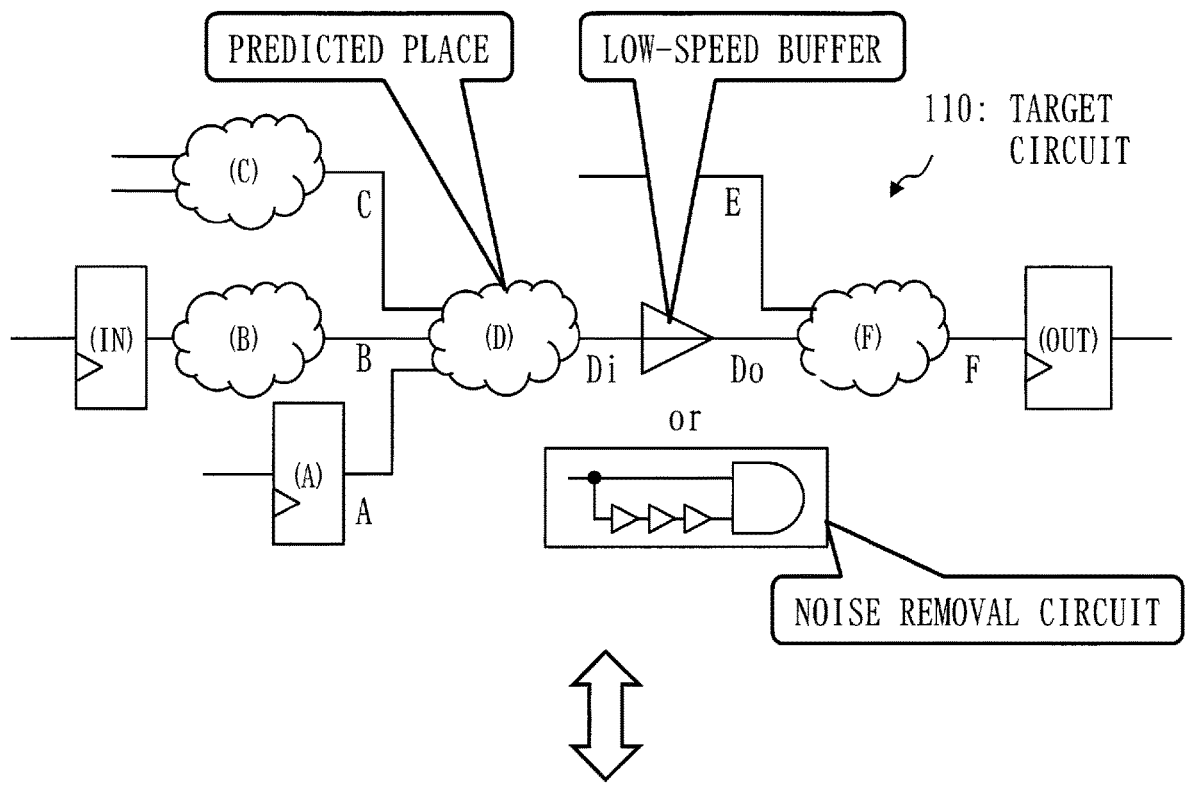
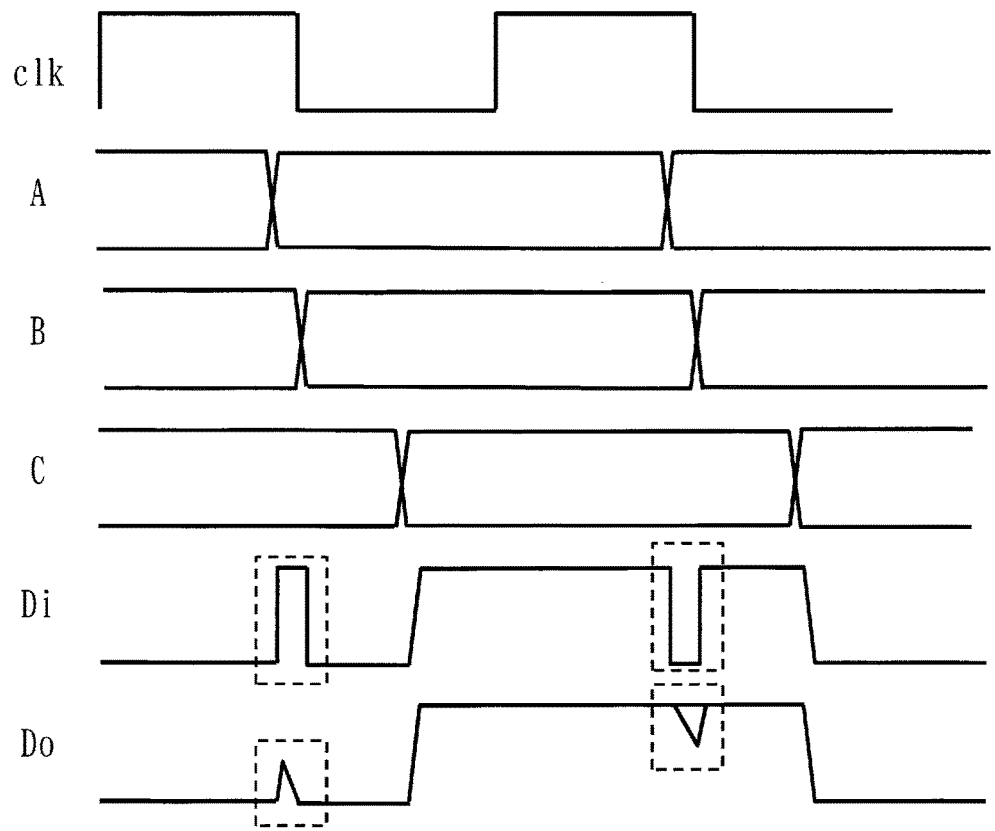

CIRCUIT DESIGN ASSISTANCE SYSTEM AND COMPUTER READABLE MEDIUM

CROSS REFERENCE TO RELATED APPLICATIONS

This application is a Continuation of PCT International Application No. PCT/JP2018/046308, filed on Dec. 17, 2018, which is hereby expressly incorporated by reference into the present application.

TECHNICAL FIELD

The present invention relates to a technique for removing glitches in circuit design.

BACKGROUND ART

In recent LSI design, the number of stages of combinational circuits between flip-flops is increasing with increased speed of miniaturized processes, and power consumption associated with occurrence of glitches cannot be ignored.

LSI is an abbreviation for Large Scale Integration.

Patent Literature 1 discloses a method for reducing generation of spike pulses in an LSI for which layout design has been completed.

In this method, a gate-level simulation is performed using a netlist and a test pattern, and a place where a glitch has occurred in the simulation is detected. Many libraries with different input delays are prepared in advance, and a library that aligns delays (timings) of a plurality of signals that are input to the detected place is used.

CITATION LIST

Patent Literature

Patent Literature 1: JP 2002-157293 A

SUMMARY OF INVENTION

Technical Problem

In the method of Patent Literature 1, a gate-level simulation is performed.

A gate-level simulation can accurately reproduce occurrence of glitches. However, it is a requirement that PVT be constant. That is, a gate-level simulation requires that each of performance of process (P), power supply voltage (V), and ambient temperature (T) be constant. Therefore, if any one of these conditions changes, a gate-level simulation needs to be newly performed.

However, a gate-level simulation takes a significantly longer period of time than an RTL simulation.

RTL is an abbreviation for Register Transfer Level.

In the method of Patent Literature 1, a netlist after completion of layout is used.

Therefore, it is not permissible for the wiring of each path and the delay of each path to change. For this reason, many libraries with the same area and the same delay need to be prepared. A gate-level simulation needs to be performed each time the device to be used or the library to be used is changed.

It is an object of the present invention to allow a circuit in which glitches are removed to be designed without performing a gate-level simulation.

Solution to Problem

A circuit design assistance system according to the present invention includes a detection unit to detect, based on synthesis result data obtained by logic synthesis on design data of a target circuit, a predicted place where a glitch is predicted to occur in the target circuit; and an insertion unit to insert a glitch removal circuit in an output side of the predicted place by making a change to at least one of the synthesis result data and the design data.

Advantageous Effects of Invention

According to the present invention, a circuit in which glitches are removed can be designed without performing a gate-level simulation.

BRIEF DESCRIPTION OF DRAWINGS

FIG. 5 is a diagram illustrating a specific example of a predicted place in the first embodiment;

FIG. 6 is a diagram illustrating a specific example of insertion of a glitch removal circuit in the first embodiment;

DESCRIPTION OF EMBODIMENTS

Figure 1:
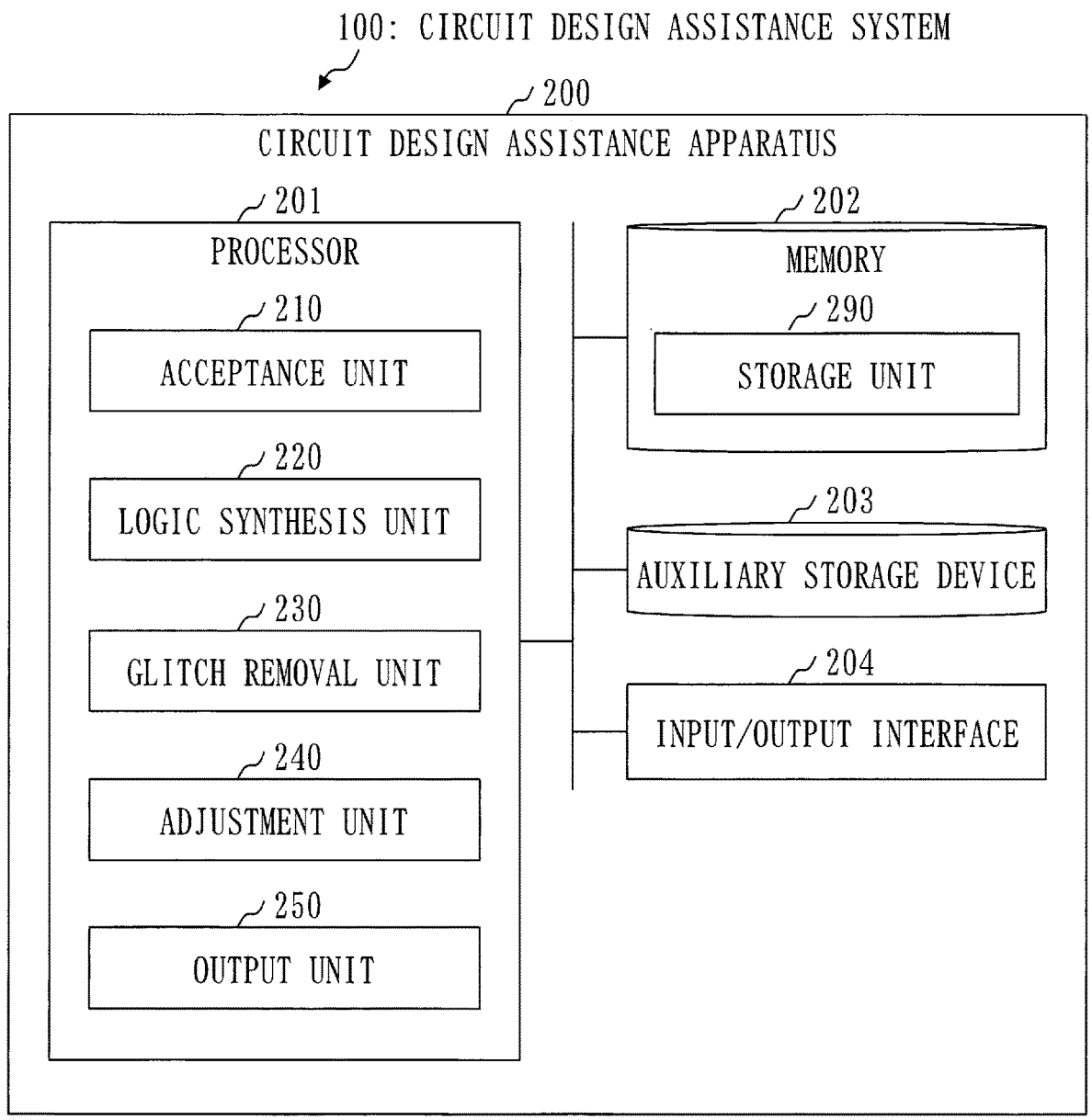
FIG. 1 is a configuration diagram of a circuit design assistance system 100 in a first embodiment.

In the embodiments and drawings, the same elements or corresponding elements are denoted by the same reference sign. Description of elements denoted by the same reference sign as any of elements that have been described will be suitably omitted or simplified. In the drawings, arrows mainly indicate flows of data or flows of processing.

First Embodiment

A circuit design assistance system 100 will be described based on FIGS. 1 to 8.

Description of Configuration

Based on FIG. 1, a configuration of the circuit design assistance system 100 and a configuration of a circuit design assistance apparatus 200 will be described.

The circuit design assistance system 100 includes the circuit design assistance apparatus 200.

The circuit design assistance apparatus 200 may be realized by two or more apparatuses.

The circuit design assistance apparatus 200 is a computer that includes hardware, such as a processor 201, a memory 202, an auxiliary storage device 203, and an input/output interface 204. These hardware components are connected with one another via signal lines.

The processor 201 is an integrated circuit (IC) that performs operational processing, and controls other hardware components. For example, the processor 201 is a central processing unit (CPU), a digital signal processor (DSP), or a graphics processing unit (GPU).

The memory 202 is a volatile storage device. The memory 202 is also called a main storage device or a main memory. For example, the memory 202 is a random access memory (RAM). Data stored in the memory 202 is saved in the auxiliary storage device 203 as necessary.

The auxiliary storage device 203 is a non-volatile storage device. For example, the auxiliary storage device 203 is a read only memory (ROM), a hard disk drive (HDD), or a flash memory. Data stored in the auxiliary storage device 203 is loaded into the memory 202 as necessary.

The input/output interface 204 is a port to which an input device and an output device are connected. For example, the input/output interface 204 is a USB terminal, the input device is a keyboard and a mouse, and the output device is a display. USB is an abbreviation for Universal Serial Bus.

The circuit design assistance apparatus 200 includes elements, such as an acceptance unit 210, a logic synthesis unit 220, a glitch removal unit 230, an adjustment unit 240, and an output unit 250. These elements are realized by software.

The auxiliary storage device 203 stores a circuit design assistance program for causing a computer to function as the acceptance unit 210, the logic synthesis unit 220, the glitch removal unit 230, the adjustment unit 240, and the output unit 250. The circuit design assistance program is loaded into the memory 202 and executed by the processor 201.

The auxiliary storage device 203 further stores an operating system (OS). At least part of the OS is loaded into the memory 202 and executed by the processor 201.

That is, the processor 201 executes the circuit design assistance program while executing the OS.

Input/output data of the circuit design assistance program is stored in a storage unit 290.

The memory 202 functions as the storage unit 290. However, a storage device such as the auxiliary storage device 203, a register in the processor 201, and a cache memory in the processor 201 may function as the storage unit 290 in place of the memory 202 or together with the memory 202.

Inputs to and outputs from the circuit design assistance apparatus 200 are performed via the input/output interface 204.

The circuit design assistance apparatus 200 may include a plurality of processors as an alternative to the processor 201. The plurality of processors share the role of the processor 201.

The circuit design assistance program can be recorded (stored) in a computer readable format in a non-volatile recording medium, such as an optical disc or a flash memory.

Based on FIG. 2, a functional configuration of the circuit design assistance apparatus 200 will be described. Illustration of hardware other than the processor 201 is omitted.

The circuit design assistance apparatus 200 includes elements, such as the acceptance unit 210, the logic synthesis unit 220, the glitch removal unit 230, the adjustment unit 240, and the output unit 250.

The acceptance unit 210 has a data acceptance unit 211.

The glitch removal unit 230 has a detection unit 231.

The adjustment unit 240 has a checking unit 241 and a cancellation unit 242.

The function of each of the elements will be described later.

Based on FIG. 3, a configuration of the storage unit 290 will be described.

The storage unit 290 stores design data 291, constraint data 292, synthesis result data 293, and the like. Each of the data will be described later.

Description of Operation

Operation of the circuit design assistance system 100 corresponds to a circuit design assistance method. A procedure of the circuit design assistance method corresponds to a procedure of the circuit design assistance program.

Based on FIG. 4, the circuit design assistance method will be described.

In step S110, a user inputs design data 291 and constraint data 292 to the circuit design assistance apparatus 200.

Then, the data acceptance unit 211 accepts the input design data 291 and the input constraint data 292.

The design data 291 is design data for a target circuit, and the constraint data 292 is constraint data for the target circuit.

The target circuit is a semiconductor integrated circuit to be designed.

The design data 291 is data to be an input of logic synthesis. Specifically, the design data 291 is an RTL source file. RTL is an abbreviation for Register Transfer Level. However, the design data 291 may be data other than an RTL source file. For example, the design data 291 may be a netlist.

The constraint data 292 is data in which various types of constraints are described. For example, timing constrains concerning each path in the target circuit are described in the constraint data 292. The constraint data 292 is written using Synopsys Design Constraints (SDC), for example.

In step S120, the logic synthesis unit 220 performs logic synthesis, using the design data 291 and the constraint data 292.

Logic synthesis is an existing technique for obtaining synthesis result data such as a netlist from design data such as an RTL source file.

Specifically, the logic synthesis unit 220 executes a logic synthesis tool, using the design data 291 and the constraint data 292 as inputs.

Synthesis result data 293 is obtained by step S120.

Specifically, the synthesis result data 293 is a netlist.

In step S130, the detection unit 231 detects one or more predicted places in the target circuit, based on the synthesis result data 293.

A predicted place is a place where a glitch is predicted to occur.

The detection unit 231 detects a predicted place as described below.

The target circuit has one or more combinational circuits. A plurality of input signals are input to each combinational circuit. Combinational circuits may be treated in units of any of cells, modules, and instances.

The detection unit 231 obtains the number of input signals of each combinational circuit from the synthesis result data 293. The number of input signals is the number of signals that are input. In other words, the number of input signals is the number of signal lines through which input signals flow.

Then, the detection unit 231 detects a combinational circuit whose number of input signals is greater than or equal to a prescribed number as a predicted place.

The prescribed number is a predetermined number of 2 or more.

Specifically, the number of input signals of each combinational circuit is the number of signals that are directly input to each combinational circuit. In other words, the number of input signals of each combinational circuit is the number of signals that are connected to the input side of each combinational circuit.

Based on FIG. 5, a specific example of a predicted place will be described.

The configuration of a target circuit 110 is described in each of the design data 291 and the synthesis result data 293.

The target circuit 110 includes, as constituent elements, a flip-flop (IN), a flip-flop (A), a combinational circuit (B), a combinational circuit (C), a combinational circuit (D), a combinational circuit (F), and a flip-flop (OUT).

Note that "clk" denotes a clock signal.

"A" denotes a signal that is output from the flip-flop (A).

"B" denotes a signal that is output from the combinational circuit (B).

"D" denotes a signal that is output from the combinational circuit (D) and input to the combinational circuit (F).

"E" denotes a signal that is input from the outside of the target circuit 110.

"F" denotes a signal that is output from the combinational circuit (F).

A combinational circuit with a large number of input signals causes a glitch to occur.

In the target circuit 110, glitches occur in the signal D that is output from the combinational circuit (D) (see portions indicated by dashed lines).

The combinational circuit (F) is placed in a stage later than the combinational circuit (D), and the signal D is input to the combinational circuit (F).

The combinational circuit (F) is caused to operate at a timing when a glitch occurs in the signal D. That is, the combinational circuit (F) is caused to operate at a redundant timing.

The prescribed number is assumed to be "3".

Three signals (A, B, and C) are input to the combinational circuit (D). That is, the number of input signals of the combinational circuit (D) is "3". Therefore, the number of input signals of the combinational circuit (D) is greater than or equal to the prescribed number.

In this case, the detection unit 231 refers to the synthesis result data 293 and detects the combinational circuit (D) as a predicted place.

Referring back to FIG. 4, the description is continued from step S140.

In step S140, an insertion unit 232 inserts a glitch removal circuit in the output side of the predicted place.

The glitch removal circuit is a circuit for removing glitches. For example, the glitch removal circuit is a low-speed buffer, a noise removal circuit, or the like.

Specifically, the insertion unit 232 inserts the glitch removal circuit in the output side of the predicted place by making a change to the design data 291. However, the insertion unit 232 may make a change to the synthesis result data 293 instead of the design data 291. The insertion unit 232 may make a change to each of the design data 291 and the synthesis result data 293.

Based on FIG. 6, a specific example of the insertion of a glitch removal circuit will be described.

The place where a glitch is predicted to occur is the combinational circuit (D).

The insertion unit 232 makes a change to the design data 291 or the synthesis result data 293 so that a low-speed buffer is inserted in the output side of the combinational circuit (D), that is, between the combinational circuit (D) and the combinational circuit (F).

The low-speed buffer is an example of a glitch removal circuit. The insertion unit 232 may insert a glitch removal circuit of another type different from the low-speed buffer. For example, the insertion unit 232 may insert a noise removal circuit.

"Di" denotes a signal that is output from the combinational circuit (D) and input to the low-speed buffer.

"Do" denotes a signal that is output from the low-speed buffer and input to the combinational circuit (F).

The signal Di in which glitches have occurred is removed by the low-speed buffer, and the signal Do from which the glitches have been removed is output from the low-speed buffer (see portions indicated by dashed lines).

Since the signal Do is input to the combinational circuit (F), the combinational circuit (F) is not caused to operate at a redundant timing due to occurrence of a glitch.

Referring back to FIG. 4, the description is continued from step S150.

In step S150, the adjustment unit 240 adjusts the circuit configuration so that each glitch removal path in the target circuit meets timing constraints.

A glitch removal path is a path that passes through a place where a glitch removal circuit is inserted.

Figure 7:
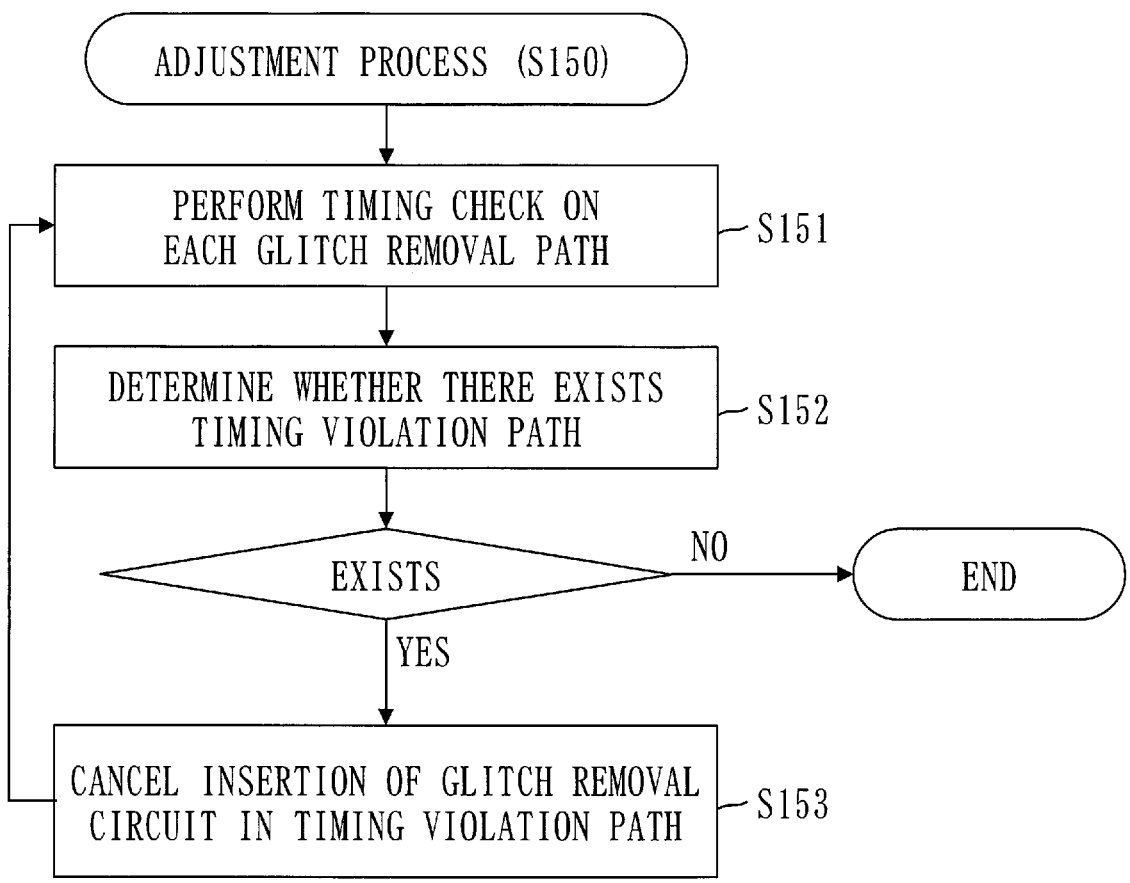
FIG. 7 is a flowchart of an adjustment process (S150) in the first embodiment.

Based on FIG. 7, a procedure for an adjustment process (S150) will be described.

In step S151, the checking unit 241 performs a timing check on each glitch removal path. A timing check is an existing technique.

The timing check is a process for checking whether each path meets timing constraints. In the timing check, it is determined based on the timing constraints whether a timing violation occurs in each path. The timing constraints are set in the constraint data 292.

Specifically, the checking unit 241 performs the timing check, using a logic synthesis tool, an STA tool, or the like. STA is an abbreviation for Static Timing Analysis.

In FIG. 6, the low-speed buffer is inserted as the glitch removal circuit in the target circuit 110.

In the target circuit 110, a path from the flip-flop [IN] to the flip-flop [OUT] is the glitch removal path.

A period range of the path from the flip-flop [IN] to the flip-flop [OUT] is set in the constraint data 292.

The checking unit 241 checks whether a period from an input of a signal to the flip-flop [IN] to an output of a signal from the flip-flop [OUT] is within the period range set in the constraint data 292.

Referring back to FIG. 7, the description is continued from step S152.

In step S152, the cancellation unit 242 determines whether there is a timing violation path.

A timing violation path is a path in which a timing violation occurs, that is, a path that does not meet the timing constraints.

If there is a timing violation path, the process proceeds to step S153.

If there is no timing violation path, the adjustment process (S150) ends.

In step S153, the cancellation unit 242 cancels the insertion of the glitch removal circuit in the timing violation path.

If a plurality of glitch removal circuits are inserted in the timing violation path, the cancellation unit 242 cancels the insertion of at least one of the glitch removal circuits.

Specifically, the cancellation unit 242 causes the change made to the design data 291 or the synthesis result data 293 in step S140 to be undone. Alternatively, the cancellation unit 242 causes the change made to each of the design data 291 and the synthesis result data 293 in step S140 to be undone.

The cancelation of the insertion of a glitch removal circuit will be explained.

When a glitch removal circuit is inserted, a certain level of delay occurs due to the glitch removal circuit. In this case, for the purpose of timing improvement, replacing part of the target circuit with a timing improvement cell, such as a cell with higher drive capability or a high-speed cell (low-Vth cell), may be considered. However, the power consumption of a timing improvement cell is high. For this reason, the insertion of a glitch removal circuit may result in increased power consumption. If this is the case, it is better not to insert a glitch removal circuit in a path in which timing is critical.

In a circuit that operates at high speed, many combinational circuits cannot be inserted between flip-flops, and it is often the case that a smaller number of glitches occur in comparison with a circuit that operates at low speed. For this reason, an option of not inserting a glitch removal circuit is selected.

After step S153, the process proceeds to step S151.

Referring back to FIG. 4, step S160 will be described.

In step S160, the output unit 250 outputs the design data 291, the constraint data 292, and the synthesis result data 293.

Effects of First Embodiment

The first embodiment makes it possible to suppress glitch components that occur at the output of a combinational circuit to which a plurality of signals are input. As a result, the number of signal transitions in stages lather than the combinational circuit is reduced, so that the power consumption of an LSI is reduced. LSI is an abbreviation for Large Scale Integration.

The number of signal transitions corresponds to an operation rate. The operation rate is a numerical value indicating at what percentage a signal is operating in relation to a case in which the signal changes every clock cycle (100 percent). Since glitches do not depend on clock cycles, if there are many glitches, the operation rate may exceed 100 percent.

The first embodiment makes it possible to effectively detect a place in which a glitch removal circuit should be inserted based on the circuit configuration, and to insert a glitch removal circuit in the detected place.

Specifically, a combinational circuit to which a plurality of signals are input can be detected, and a glitch removal circuit can be inserted in the output side of the detected combinational circuit.

A glitch occurrence place is detected based on the circuit configuration, so that a glitch removal circuit can be easily inserted in a short period of time in the design stage (RTL stage) in an early stage of development.

In the first embodiment, a gate-level simulation is not necessary and thus a test pattern is also not necessary, so that the first embodiment is not affected by the layout to be obtained in a later stage of development and the library to be used.

Other Configurations

In FIG. 6, the low-speed buffer or the noise removal circuit is inserted as a glitch removal circuit.

However, a glitch removal circuit of a type different from the low-speed buffer and the noise removal circuit may be inserted.

Figure 8:
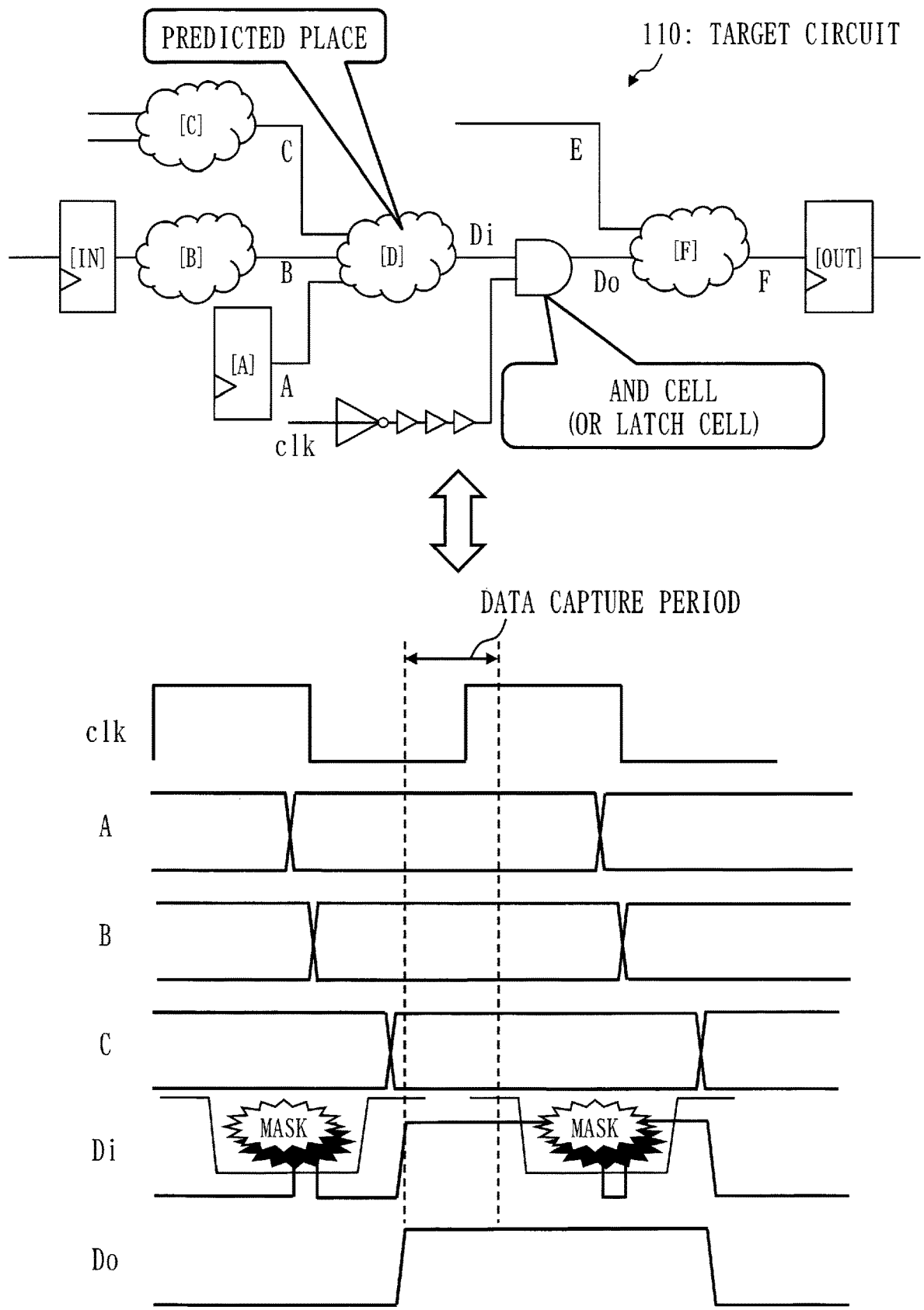
FIG. 8 is a diagram illustrating a specific example of insertion of a glitch removal circuit in the first embodiment.

In FIG. 8, an AND cell is inserted as a noise removal circuit. A latch cell may be inserted in place of the AND cell. By using the AND cell or the latch cell, the signal Di can be masked when it is not in a data capture period. That is, this allows glitches to be removed. The data capture period is a period having a predetermined period of time including a timing at which the clock signal changes from low to high. Note that some period of time is excluded from the data capture period due to a setup violation or a hold violation.

Second Embodiment

Figure 9:
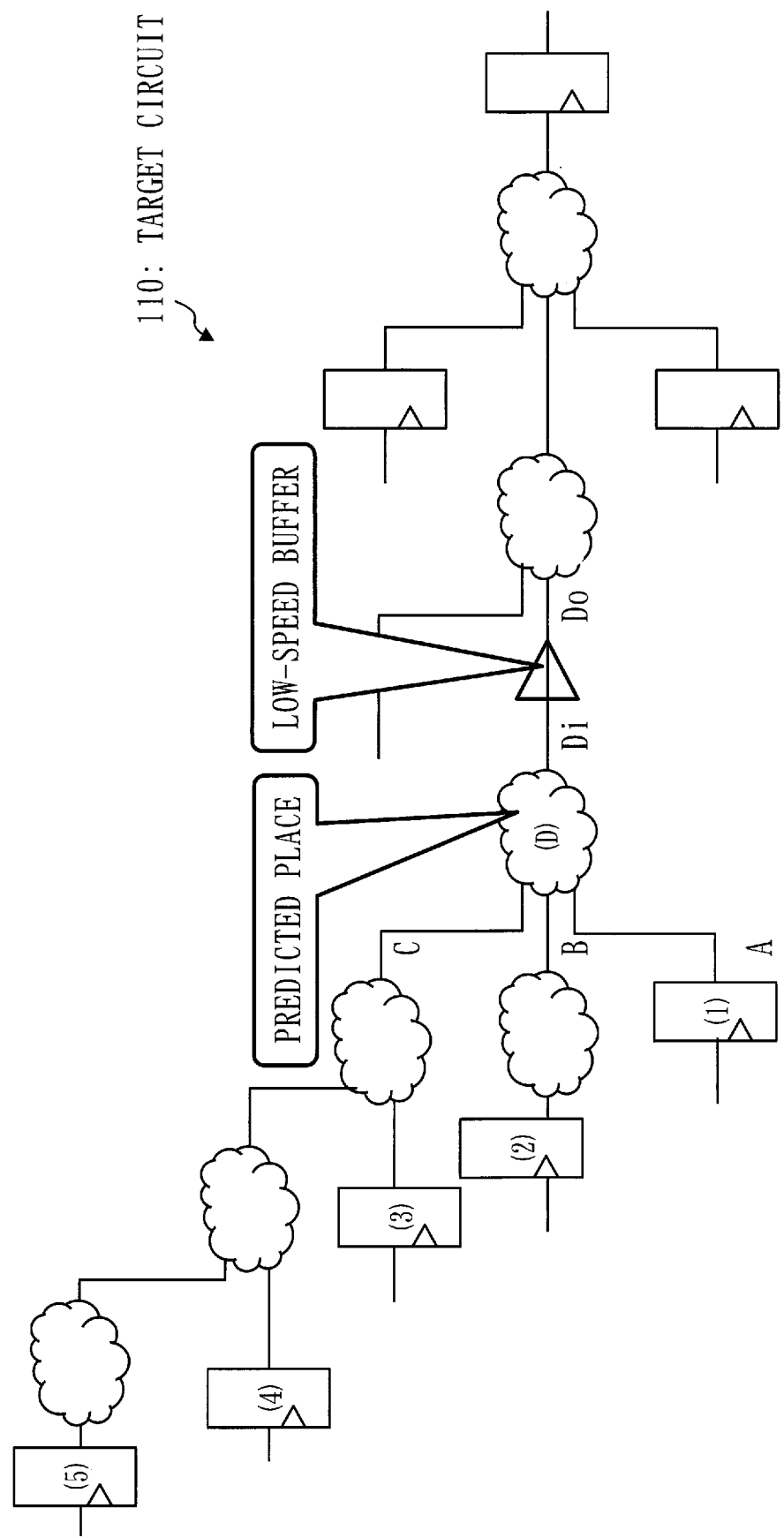
FIG. 9 is a diagram explaining the number of input signals in a second embodiment.

With regard to an embodiment in which the accuracy of detecting a glitch occurrence place is enhanced, differences from the first embodiment will be mainly described based on FIG. 9

Description of Configuration

Figure 2:
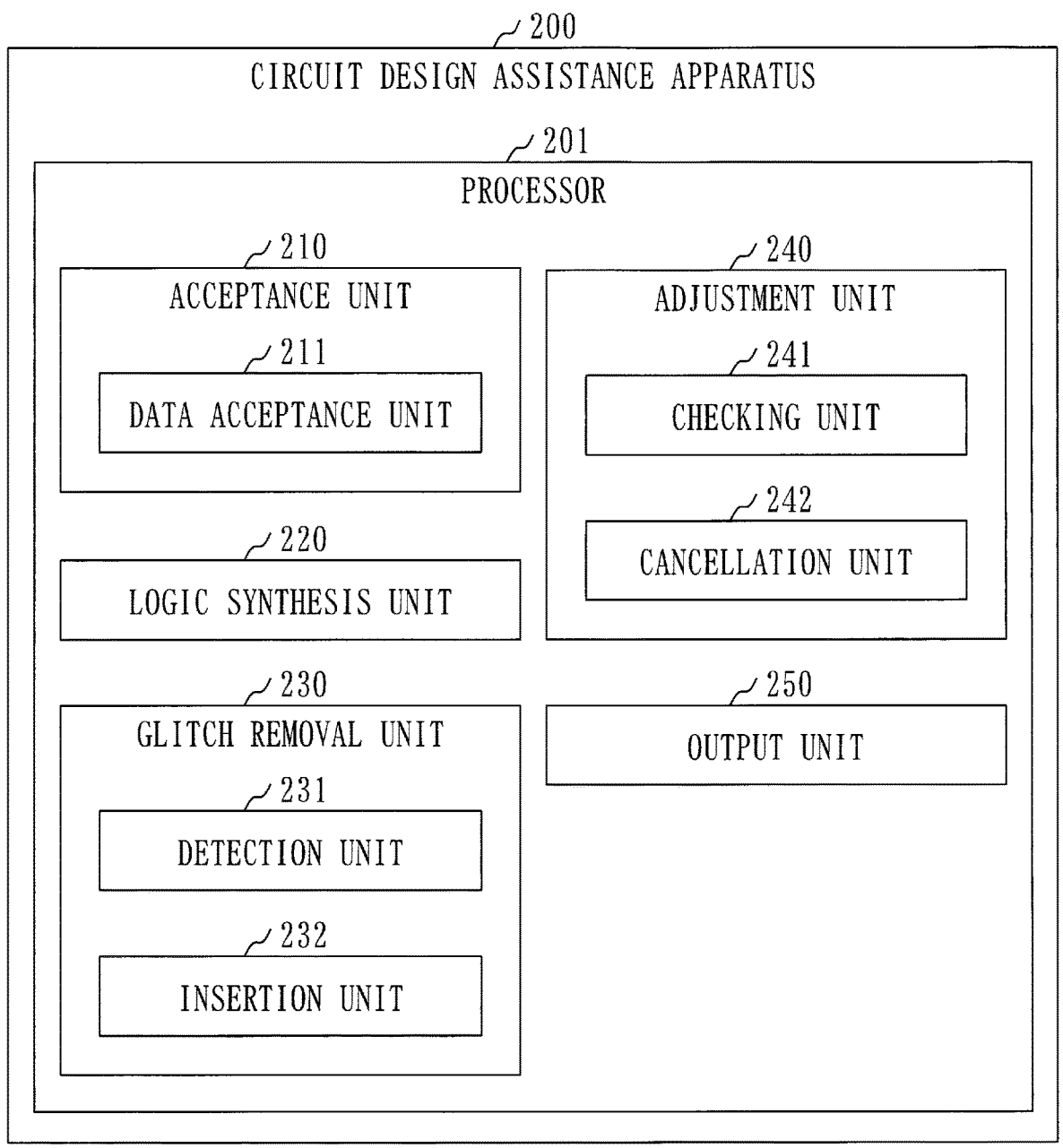
FIG. 2 is a functional configuration diagram of a circuit design assistance apparatus 200 in the first embodiment.
Figure 3:
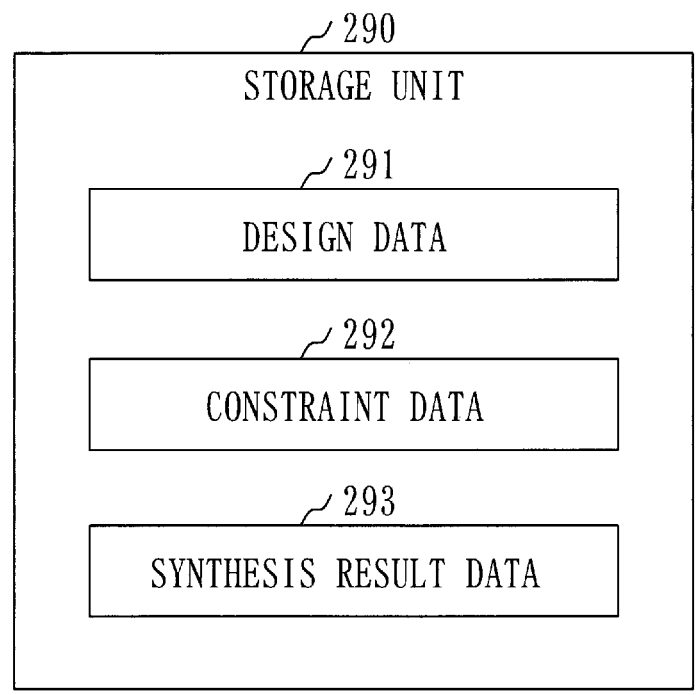
FIG. 3 is a configuration diagram of a storage unit 290 in the first embodiment.

The configuration of the circuit design assistance system 100 is the same as the configuration in the first embodiment (see FIGS. 1 to 3).

Description of Operation

Figure 4:
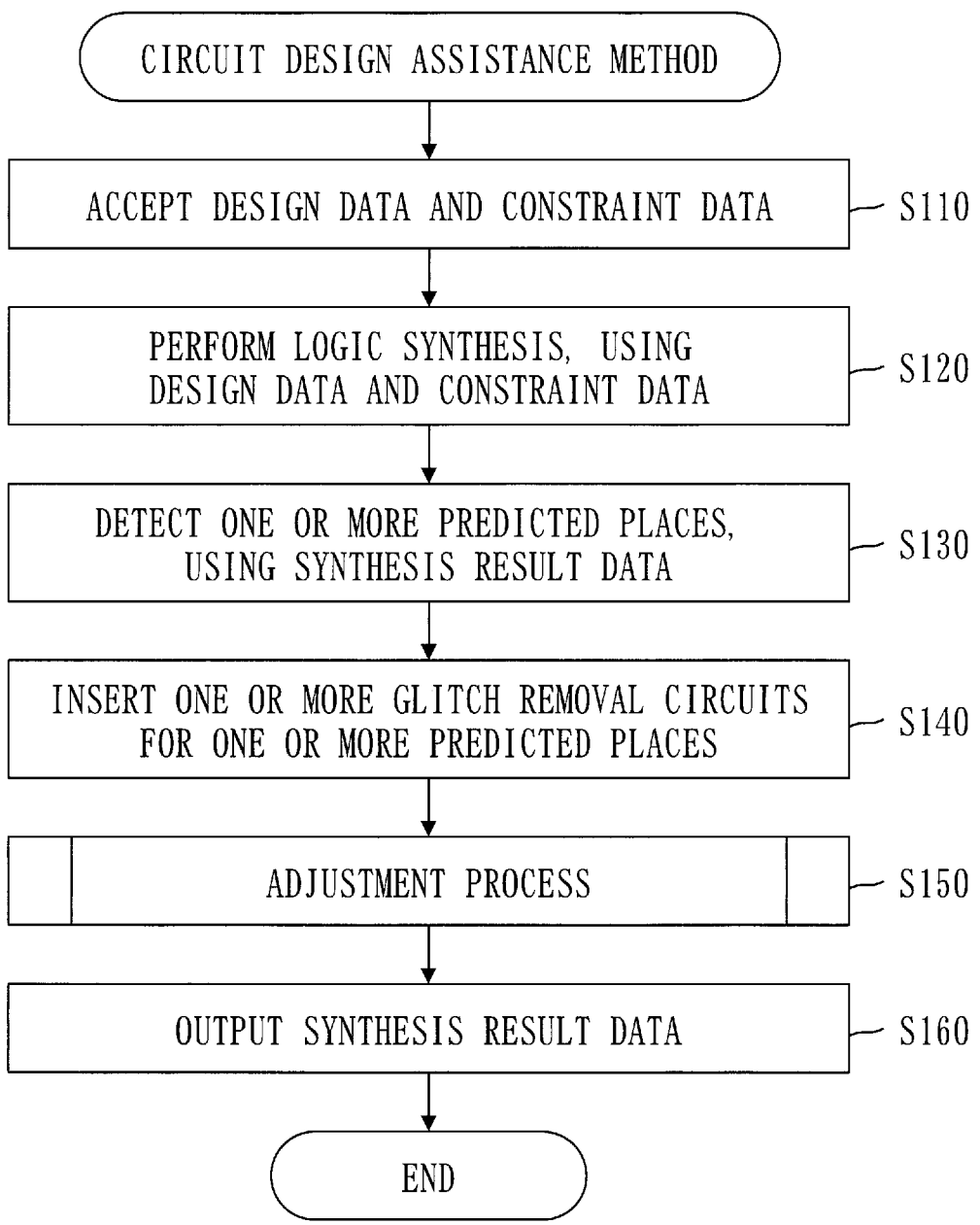
FIG. 4 is a flowchart of a circuit design assistance method in the first embodiment.

The overall flow of the circuit design assistance method is the same as the flow in the first embodiment (see FIG. 4).

However, a detection process (S130) is different from the process in the first embodiment.

In step S130, the detection unit 231 detects one or more predicted places in the target circuit, based on the synthesis result data 293.

A predicted place is a place where a glitch is predicted to occur.

Specifically, the detection unit 231 counts the number of applicable paths for each combinational circuit as the number of input signals of each combinational circuit.

An applicable path is a path that does not pass through another flip-flop, among one or more paths to a combinational circuit from one or more flip-flops placed in stages earlier than the combinational circuit.

For example, the detection unit 231 traces back from the combinational circuit to each flip-flop with which each input signal directly input to the combinational circuit is connected, and counts the number of these input signals (the number of flip-flops).

For example, the detection unit 231 counts the number of input signals of each combinational circuit by executing a fan-in connection analysis function of a logic synthesis tool, using the synthesis result data 293 as an input.

Based on FIG. 9, a specific example of the number of input signals of a combinational circuit will be described. Note that "A" denotes a signal that is output from a flip-flop (1).

Three signals, a signal A, a signal B, and a signal C, are directly input to the combinational circuit (D). Therefore, in the first embodiment, the number of input signals of the combinational circuit (D) is "3".

Five flip-flops (1) to (5) are placed in stages earlier than the combinational circuit (D). The five paths from the flip-flops (1) to (5) to the combinational circuit (D) include no path that passes through another flip-flop. In other words, when the connection sources of the three signals (A) to (C) are traced back from the combinational circuit (D), they are traced to the five flip-flops (1) to (5). Therefore, in this embodiment, the number of input signals of the combinational circuit (D) is "5".

The prescribed number to be compared with the number of input signals of each combinational circuit is assumed to be "5". In this case, in the first embodiment, the number of input signals "3" of the combinational circuit (D) is less than the prescribed number "5", so that the combinational circuit (D) is not detected as a predicted place.

In this embodiment, the number of input signals "5" of the combinational circuit (D) is not less than the prescribed number "5", so that the combinational circuit (D) is detected as a predicted place. Then, a glitch removal circuit (for example, a low-speed buffer) is inserted in the output side of the combinational circuit (D).

Effects of Second Embodiment

In the second embodiment, the connection sources of each input signal of the combinational circuit is traced back to a flip-flop, and the number of input signals (the number of flip-flops) is counted.

Therefore, in comparison with a case in which a glitch occurrence place is detected based on the number of signals directly input to each combinational circuit, the accuracy of detecting a glitch occurrence place can be enhanced.

Third Embodiment

Figure 10:
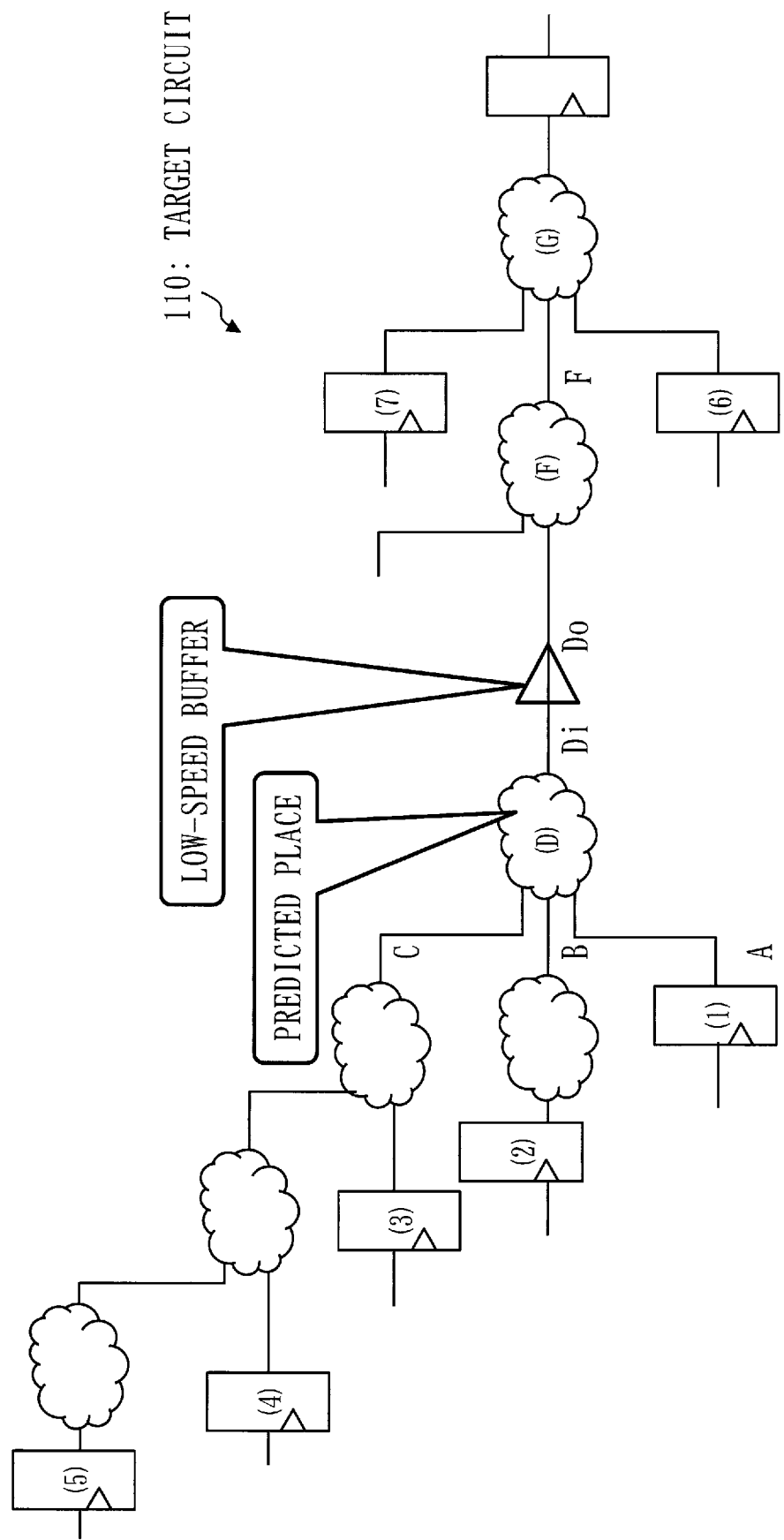
FIG. 10 is a diagram explaining the number of input signals in a third embodiment.

With regard to an embodiment in which places where glitch removal circuits are inserted are optimized, differences from the first and second embodiments will be mainly described based on FIG. 10.

Description of Configuration

The configuration of the circuit design assistance system 100 is the same as the configuration in the first embodiment (see FIGS. 1 to 3).

Description of Operation

The overall flow of the circuit design assistance method is the same as the flow in the first embodiment (see FIG. 4).

However, the detection process (S130) is different from the process in the first embodiment.

In step S130, the detection unit 231 detects one or more predicted places in the target circuit, based on the synthesis result data 293.

A predicted place is a place where a glitch is predicted to occur.

Specifically, the detection unit 231 counts applicable paths for each combinational circuit as the number of input signals of each combinational circuit, as described in the second embodiment.

However, if another predicted place is detected in a stage earlier than the combinational circuit, the detection unit 231 counts one or more applicable paths that pass through this predicted place as one applicable path.

Based on FIG. 10, a specific example of the number of input signals of a combinational circuit will be described.

The prescribed number to be compared with the number of input signals of each combinational circuit is assumed to be "5".

Five flip-flops (1) to (5) are placed in stages earlier than the combinational circuit (D). The number of applicable paths for the combinational circuit (D) is "5". Therefore, the number of input signals of the combinational circuit (D) is "5".

The number of input signals "5" of the combinational circuit (D) is not less than the prescribed number "5", so that the combinational circuit (D) is detected as a predicted place. Therefore, a glitch removal circuit (for example, a low-speed buffer) is inserted in the output side of the combinational circuit (D).

Seven flip-flops (1) to (7) are placed in stages earlier than a combinational circuit (G). The number of applicable paths for the combinational circuit (G) is "7". Therefore, in the second embodiment, the number of input signals of the combinational circuit (G) is "7".

However, the combinational circuit (D) is detected as a predicted place, and a glitch removal circuit is inserted in the output side of the combinational circuit (D). In this embodiment, the five applicable paths for the combinational circuit (D) are counted as one applicable path. Therefore, in this embodiment, the number of input signals of the combinational circuit (G) is "3".

In the second embodiment, the number of input signals "8" of the combinational circuit (G) is not less than the prescribed number "5", so that the combinational circuit (G) is detected as a predicted place. As a result, a glitch removal circuit is inserted in the output side of each of the combinational circuit (D) and the combinational circuit (G).

In this embodiment, the number of input signals "3" of the combinational circuit (G) is less than the prescribed number "5", so that the combinational circuit (G) is not detected as a predicted place. As a result, a glitch removal circuit is inserted in the output side of the combinational circuit (D), but a glitch removal circuit is not inserted in the output side of the combinational circuit (G).

Effects of Third Embodiment

When there are a plurality of combinational circuits to each of which a plurality of signals are input on a single path, it is inefficient to insert a glitch removal circuit in the output side of every combinational circuit on that path.

The third embodiment makes it possible to optimize the places in which glitch removal circuits are to be inserted and the number of glitch removal circuits to be inserted.

Fourth Embodiment

Figure 11:
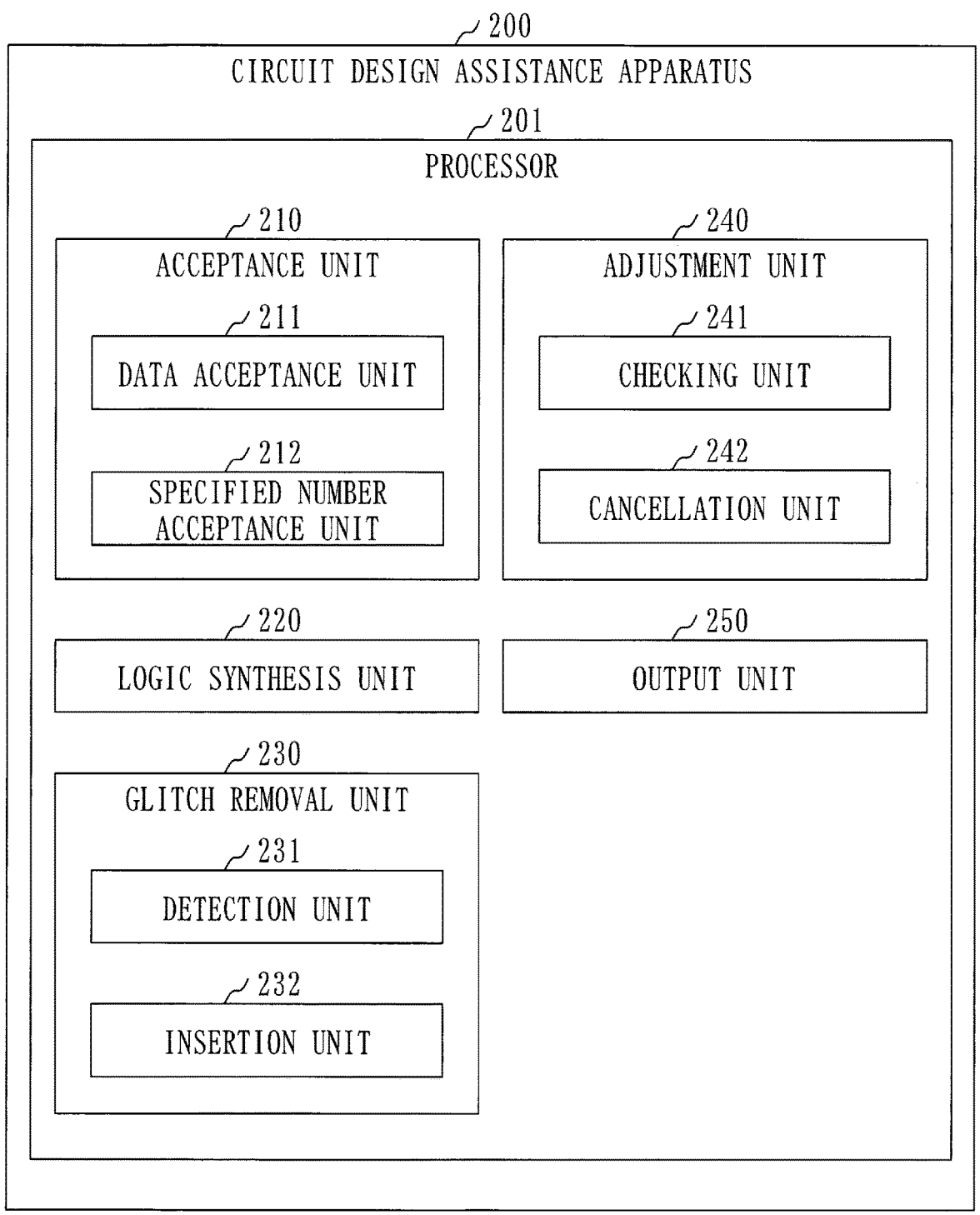
FIG. 11 is a functional configuration diagram of the circuit design assistance apparatus 200 in a fourth embodiment.
Figure 12:
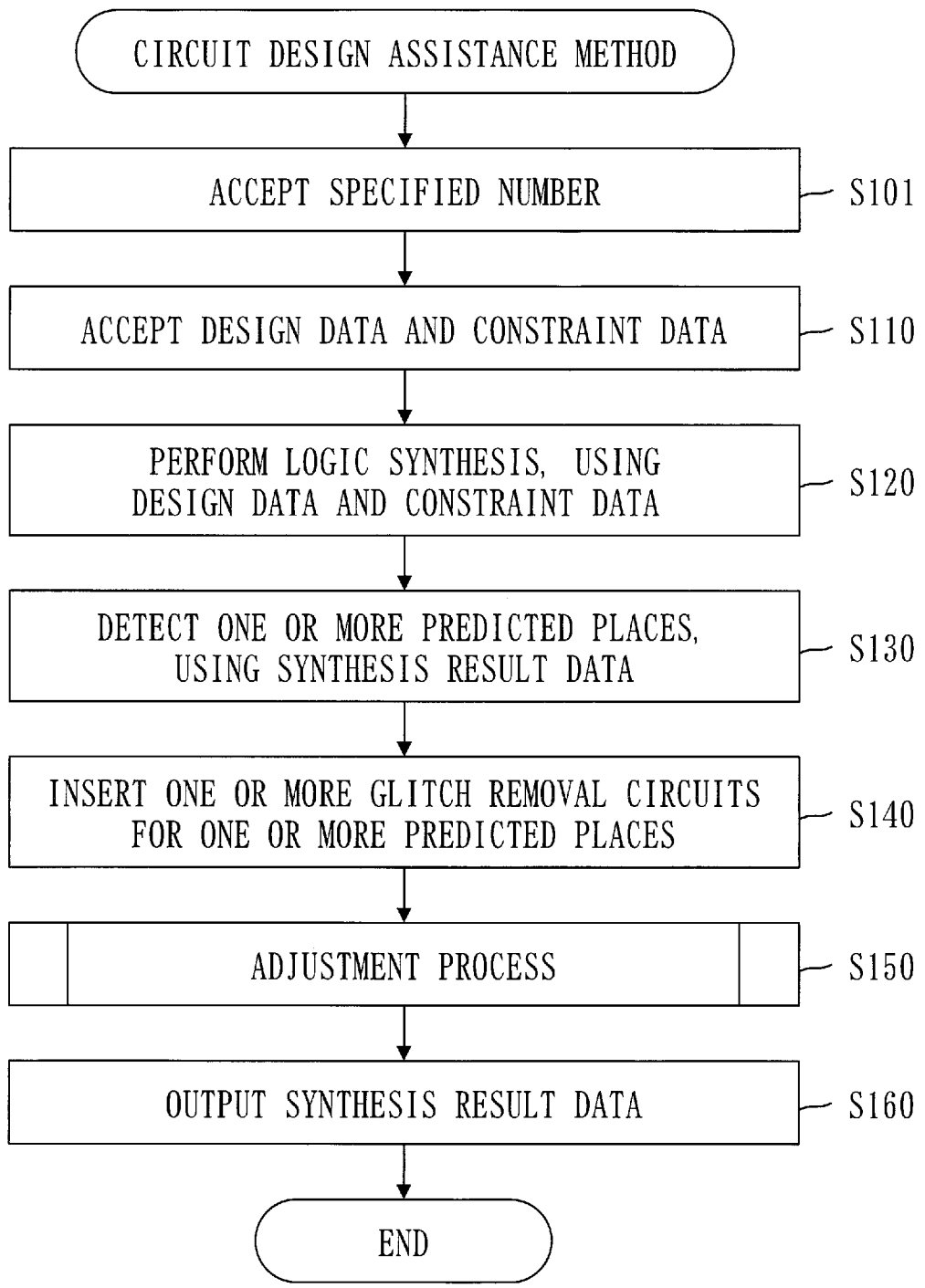
FIG. 12 is a flowchart of the circuit design assistance method in the fourth embodiment.

With regard to an embodiment in which the prescribed number to be compared with the number of input signals of each combinational circuit can be suitably changed, differences from the first to third embodiments will be mainly described based on FIGS. 11 and 12.

Description of Configuration

The overall configuration of the circuit design assistance system 100 is the same as the configuration in the first embodiment (see FIG. 1).

However, the configuration of the acceptance unit 210 is different from the configuration in the first embodiment.

Based on FIG. 11, the configuration of the acceptance unit 210 will be described.

The acceptance unit 210 further includes a specified number acceptance unit 212.

The function of the specified number acceptance unit 212 will be described later.

Description of Operation

Based on FIG. 12, the circuit design assistance method will be described.

In step S101, a user inputs a specified number to the circuit design assistance apparatus 200. The specified number is a number of 2 or more.

Then, the specified number acceptance unit 212 accepts the input specified number.

The process from step S110 to step S160 is as described in the first to third embodiments.

However, in step S130, the detection unit 231 uses the accepted specified number as the prescribed number.

For example, the specified number acceptance unit 212 updates the prescribed number that is set in the detection unit 231 with the specified number.

Effects of Fourth Embodiment

The fourth embodiment makes it possible to suitably change the prescribed number to be compared with the number of input signals of each combinational circuit.

Fifth Embodiment

Figure 13:
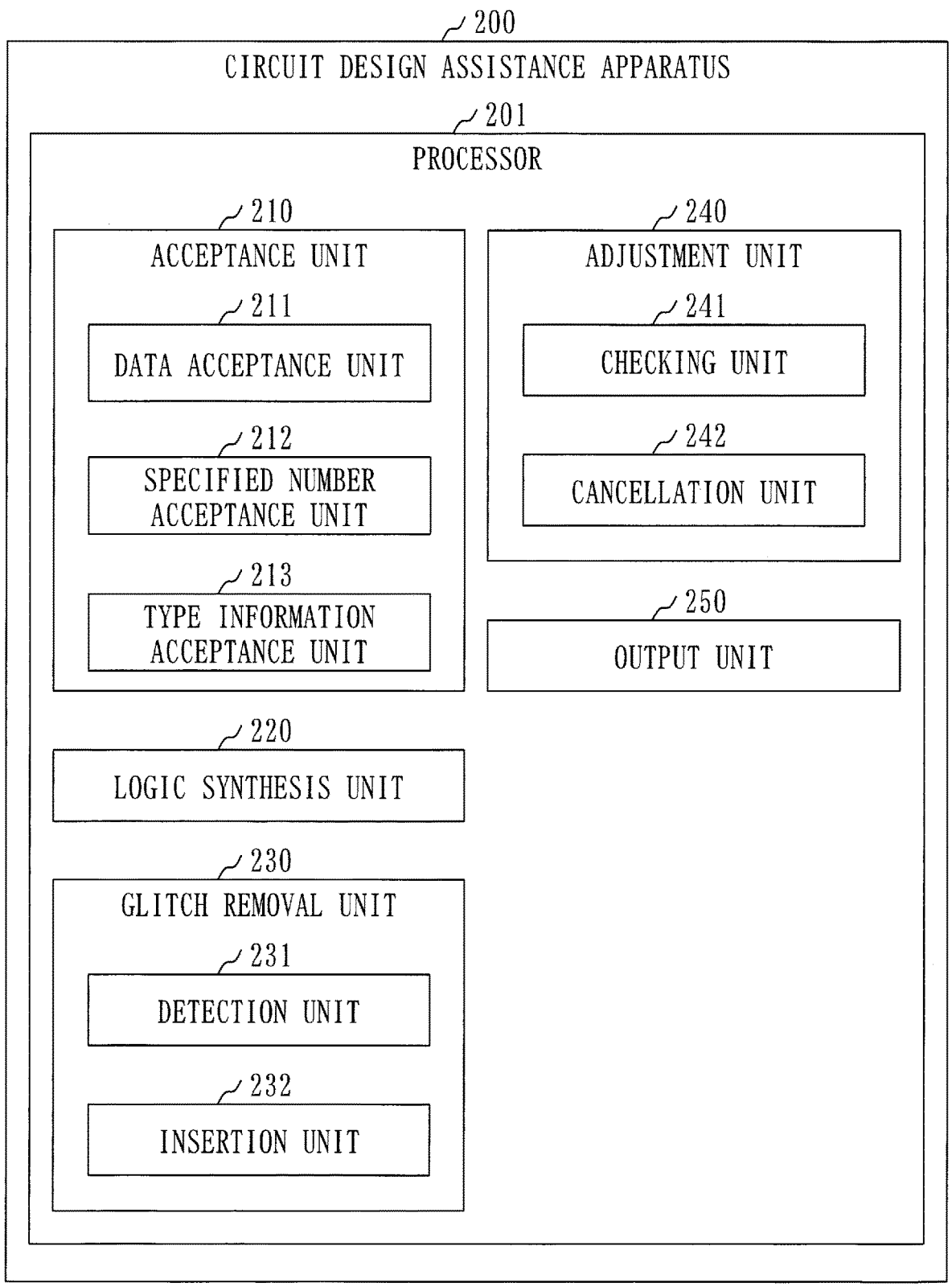
FIG. 13 a functional configuration diagram of the circuit design assistance apparatus 200 in a fifth embodiment.
Figure 14:
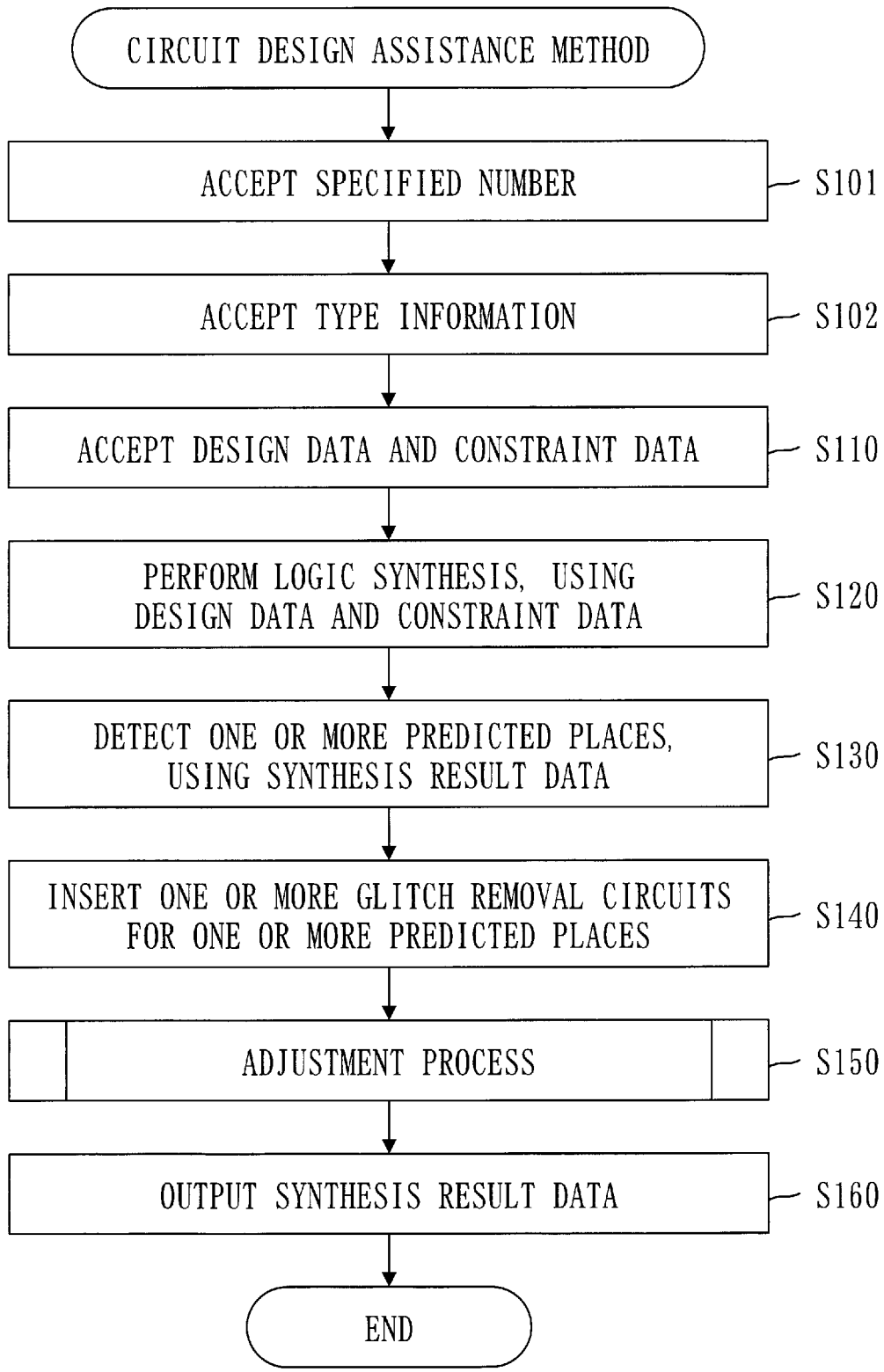
FIG. 14 is a flowchart of the circuit design assistance method in the fifth embodiment.

With regard to an embodiment in which a glitch removal circuit of an appropriate type can be inserted, differences from the first to fourth embodiments will be mainly described based on FIGS. 13 and 14.

Description of Configuration

The overall configuration of the circuit design assistance system 100 is the same as the configuration in the first embodiment (see FIG. 1).

However, the configuration of the acceptance unit 210 is different from the configuration in the first embodiment.

Based on FIG. 13, the configuration of the acceptance unit 210 will be described.

The acceptance unit 210 further includes a type information acceptance unit 213.

The function of the type information acceptance unit 213 will be described later.

Description of Operation

Based on FIG. 14, the circuit design assistance method will be described.

In step S101, the specified number acceptance unit 212 accepts a specified number.

Step S101 is as described in the fourth embodiment (see FIG. 12).

In step S102, the type information acceptance unit 213 accepts type information.

The type information is information for identifying the type of a glitch removal circuit.

The process from step S110 to step S160 is as described in the first to fourth embodiments.

However, in step S140, the insertion unit 232 inserts a glitch removal circuit of the type identified by the accepted type information.

For example, the type information is a type identifier that identifies the type of a glitch removal circuit. In this case, the insertion unit 232 inserts a glitch removal circuit of the type identified by the type identifier.

For example, the type information indicates a design situation, such as a condition at design or a state at design. In this case, a type table in which a design situation and a type identifier are associated with each other is stored in advance in the storage unit 290. The insertion unit 232 obtains the type identifier corresponding to the design situation indicated by the type information from the type table, and inserts a glitch removal circuit of the type identified by the obtained type identifier.

The types of glitch removal circuits will be described.

The types of glitch removal circuits include a buffer cell, a noise removal circuit, an AND cell, and a latch cell.

The buffer cell does not allow a high-frequency pulse signal such as a glitch to pass through, but the operation speed is slow. A specific example of the buffer cell is a high-Vth cell.

The AND cell masks (gates) a signal.

The buffer cell has the following characteristics.

Advantages

Revision and layout design are facilitated.
Reduces the area and power consumption.

Disadvantages

Glitches cannot be completely removed.
Increases a path delay.

For example, if it is desirable to facilitate layout design, or if it is desirable to reduce the area and power consumption, the buffer cell is suitable.

The noise removal circuit has the following characteristics.

Advantages

Glitches can be easily removed. A delay element can be used for adjustment.
The configuration is simple, so that design is facilitated.

Disadvantages

Increases a path delay.

For example, if it is desirable to remove glitches of various widths as much as possible, the noise removal circuit is suitable.

The AND cell has the following characteristics.

Advantages

Glitches can be easily removed. Glitches of a wide width can also be easily removed.
Has little influence on a path delay.

Disadvantages

The circuit becomes complex, so that the difficulty of layout design increases.
For example, if there is concern about path timing (speeding up), the AND cell is suitable.
The latch cell has the following characteristics.

Advantages

Glitches can be easily removed. Glitches of a wide width can also be easily removed.
Timing control of a masked place is relatively easy.

Disadvantages

The circuit becomes very complex, so that the difficulty of layout design increases.
Increases the area (circuit scale).
For example, if it is desirable to suppress glitches as much as possible, the latch cell is suitable.

Effects of Fifth Embodiment

The fifth embodiment makes it possible to insert a glitch removal circuit of an appropriate type.

Other Configurations

The acceptance unit 210 may be configured without the specified number acceptance unit 212. When the acceptance unit 210 does not include the specified number acceptance unit 212, step 5101 is not necessary.

Sixth Embodiment

Figure 15:
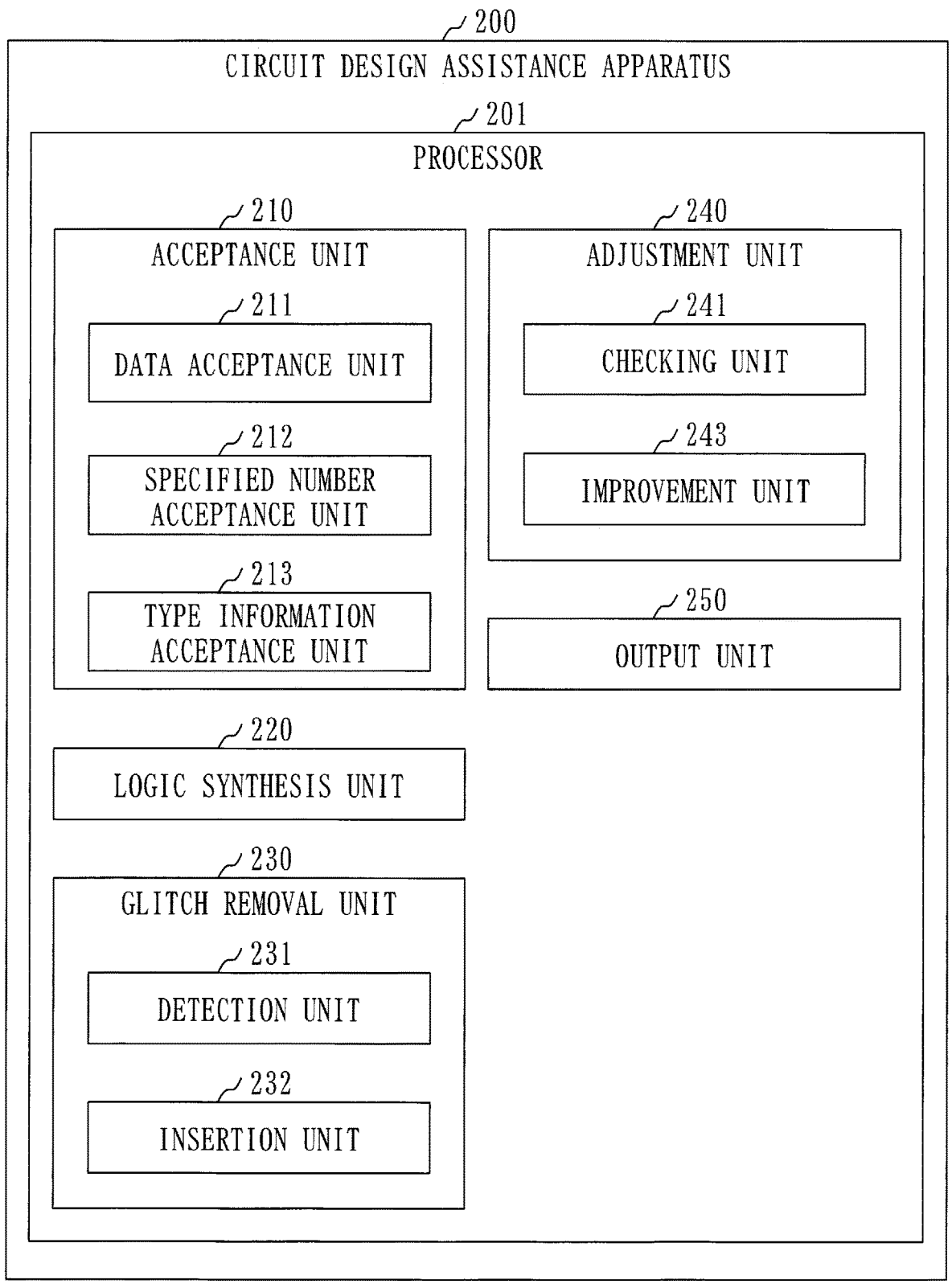
FIG. 15 is a functional configuration diagram of the circuit design assistance apparatus 200 in a sixth embodiment.
Figure 16:
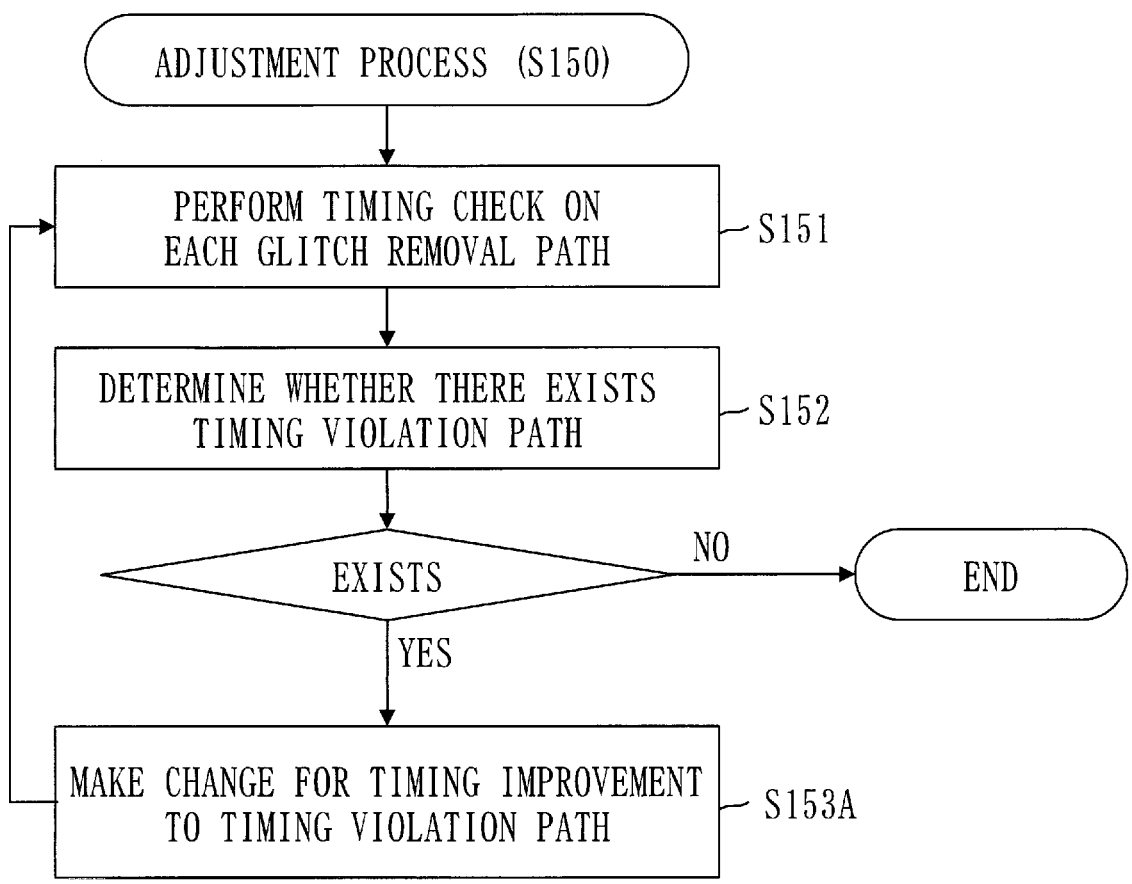
FIG. 16 is a flowchart of the adjustment process (S150) in the sixth embodiment.
Figure 17:
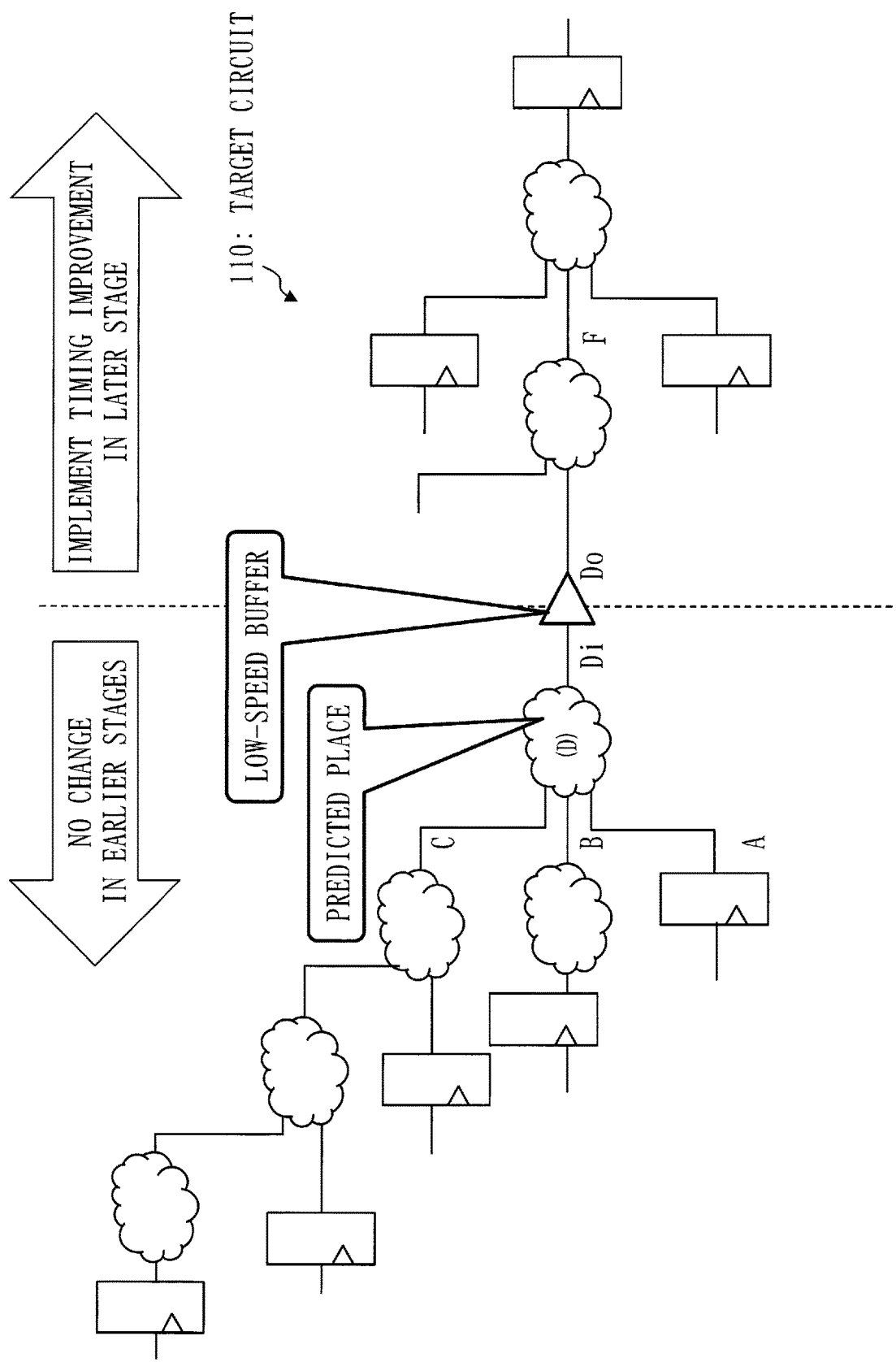
FIG. 17 is a diagram explaining a dont_touch constraint in the sixth embodiment.

With regard to an embodiment in which timing improvement is implemented without canceling the insertion of a glitch removal circuit in a path in which a timing violation occurs, differences from the first to fifth embodiments will be mainly described based on FIGS. 15 to 17.

Description of Configuration

The overall configuration of the circuit design assistance system 100 is the same as the configuration in the first embodiment (see FIG. 1).
However, the configuration of the adjustment unit 240 is different from the configuration in the first embodiment.
Based on FIG. 15, the configuration of the adjustment unit 240 will be described.
The adjustment unit 240 includes an improvement unit 243 in place of the cancellation unit 242 (for example, see FIG. 13).
The function of the improvement unit 243 will be described later.

Description of Operation

The overall flow of the circuit design assistance method is the same as the flow in the fifth embodiment (see FIG. 14).
However, the adjustment process (S150) is different from the process in the first to fifth embodiments.
Based on FIG. 16, a procedure for the adjustment process (S150) will be described.
Step S151 and step S152 are as described in the first embodiment (see FIG. 7).
In step S151, the checking unit 241 performs a timing check on each glitch removal path.
A glitch removal path is a path that passes through a place where a glitch removal circuit is inserted.
In step S152, the cancellation unit 242 determines whether there is a timing violation path.
A timing violation path is a path in which a timing violation occurs, that is, a path that does not meet the timing constraints.
If there is a timing violation path, the process proceeds to step S153A.
If there is no timing violation path, the adjustment process (S150) ends.
In step S153A, the improvement unit 243 makes a change for timing improvement to the timing violation path by making a change to the constraint data 292.
The place where a glitch removal circuit is inserted in the timing violation path will be referred to as an "insertion place".
The improvement unit 243 makes the change for timing improvement in a stage later than the insertion place.
Specifically, the improvement unit 243 writes a constraint that inhibits changes in stages earlier than the insertion place in the constraint data 292.
For example, the improvement unit 243 writes a dont_touch constraint for stages earlier than the insertion place in the constraint data 292.
Based on FIG. 17, a specific example of the dont_touch constraint will be described.
In the target circuit 110, the combinational circuit (D) is detected as a predicted place, and a glitch removal circuit (for example, a low-speed buffer) is inserted in the output side of the combinational circuit (D).
The dont_touch constraint for stages earlier than the glitch removal circuit prevents the stages earlier than the glitch removal circuit from being modified. As a result, timing improvement is implemented in a stage later than the glitch removal circuit.
Note that even if the speed is increased in an earlier stage, timing improvement may be prevented by another slow path, or glitches may be generated differently, resulting in increased glitches.

Effects of Sixth Embodiment

When timing improvement is to be implemented, the drive capability of the cell to be used is increased or a high-speed buffer is inserted. However, these measures tend to increase power consumption, although the operation becomes faster.
In the sixth embodiment, a change is made in a stage later than the glitch removal circuit in order to prevent an increase in the operation rate of the place where the measure is implemented. This can reduce the influence of glitches on the timing improvement measure and can prevent power consumption from being increased.

Other Configurations

The acceptance unit 210 may be configured without the specified number acceptance unit 212 and the type information acceptance unit 213. When the acceptance unit 210 does not include the specified number acceptance unit 212, step S101 is not necessary. When the acceptance unit 210 does not include the type information acceptance unit 213, step S102 is not necessary.

Seventh Embodiment

Figure 18:
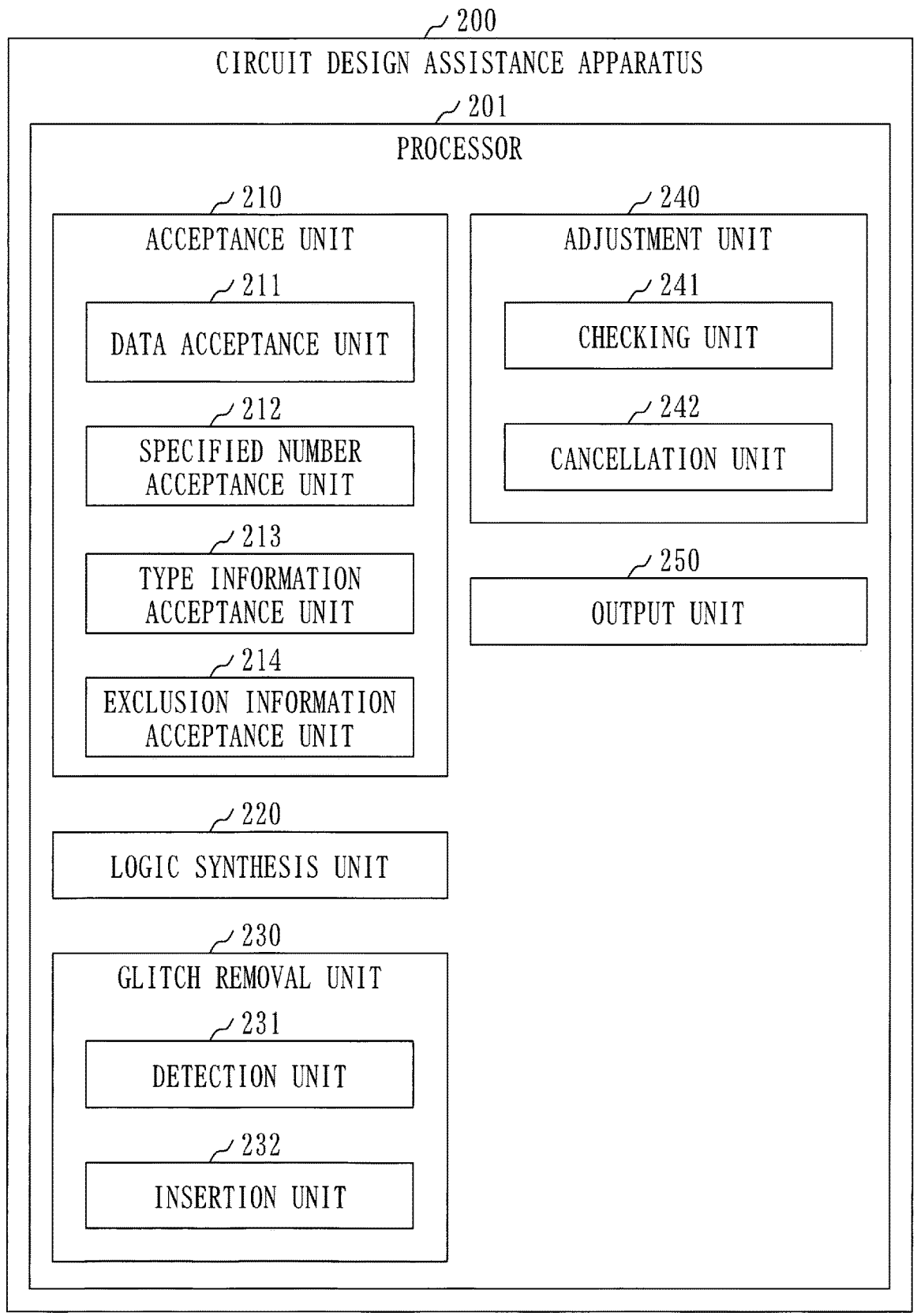
FIG. 18 is a functional configuration diagram of the circuit design assistance apparatus 200 in a seventh embodiment.
Figure 19:
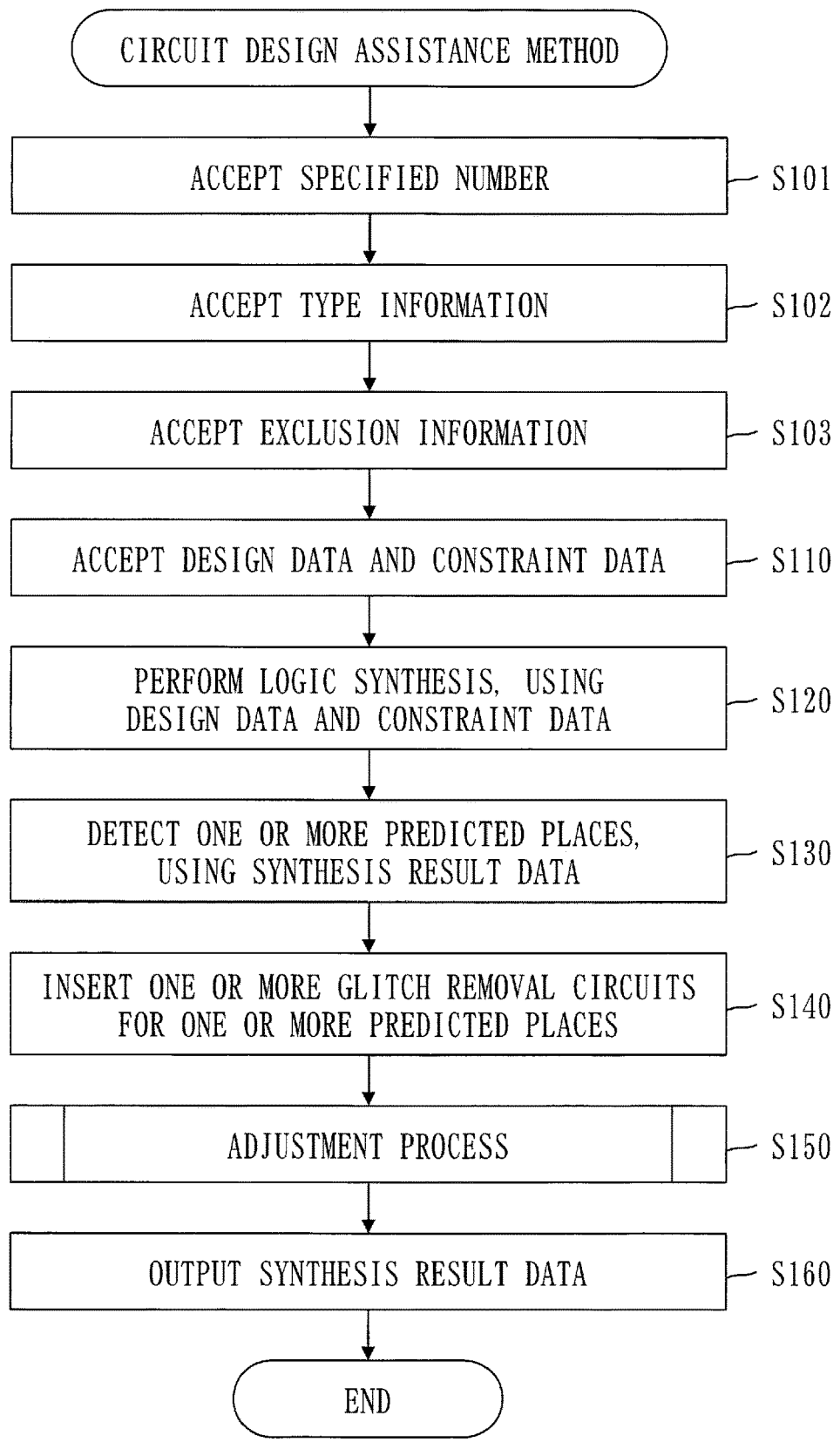
FIG. 19 is a flowchart of the circuit design assistance method in the seventh embodiment.

With regard to an embodiment in which the insertion of a glitch removal circuit in a place with a low operation rate is prohibited, differences from the first to sixth embodiments will be mainly described based on FIGS. 18 and 19.

Description of Configuration

The overall configuration of the circuit design assistance system 100 is the same as the configuration in the first embodiment (see FIG. 1).

However, the configuration of the acceptance unit 210 is different from the configuration in the first embodiment.

Based on FIG. 18, the configuration of the acceptance unit 210 will be described.

The acceptance unit 210 further includes an exclusion information acceptance unit 214.

The function of the exclusion information acceptance unit 214 will be described later.

Description of Operation

Based on FIG. 19, the circuit design assistance method will be described.

In step S101, the specified number acceptance unit 212 accepts a specified number.

Step S101 is as described in the fourth embodiment (see FIG. 12).

In step S102, the type information acceptance unit 213 accepts type information.

Step S102 is as described in the fifth embodiment (see FIG. 14).

Step S103 will be described.

There may be a circuit (input signal) that does not normally operate depending on the circuit or input signal, or there may be a circuit (input signal) whose operation rate is originally low.

When a designer is aware of a part (circuit, path, etc.) with a low operation rate, the designer inputs exclusion information for specifying the part with a low operation rate to the circuit design assistance apparatus 200.

In step S103, the exclusion information acceptance unit 214 accepts exclusion information.

The exclusion information is information for specifying the part with a low operation rate.

The process from step S110 to step S160 is as described in the first to sixth embodiments.

However, in step S140, the insertion unit 232 determines whether a predicted place is included in the part specified by the accepted exclusion information. If a predicted place is included in the part specified by the accepted exclusion information, the insertion unit 232 does not insert a glitch removal circuit in the output side of this predicted place.

Effects of Seventh Embodiment

The seventh embodiment makes it possible to prevent a glitch removal circuit from being inserted in a place with a low operation rate.

Other Configurations

The acceptance unit 210 may be configured without the specified number acceptance unit 212 and the type information acceptance unit 213. When the acceptance unit 210 does not include the specified number acceptance unit 212, step S101 is not necessary. When the acceptance unit 210 does not include the type information acceptance unit 213, step S102 is not necessary.

The adjustment unit 240 may include the improvement unit 243 in place of the cancellation unit 242.

Summary of Embodiments

The suppression of power consumption associated with occurrence of glitches has so far been difficult, requiring a heavy workload and a great amount of time.

Each of the embodiments makes it possible to easily suppress power consumption associated with occurrence of glitches.

In each of the embodiments, a gate-level simulation is not necessary, so that a test pattern is not necessary. Glitches can be suppressed easily in a short period of time in an early stage of development.

The method of Patent Literature 1 depends on a device, a library, and the like, while each of the embodiments does not depend on a device, a library, and the like.

In the future, progress in miniaturized processes will further increase power consumption associated with occurrence of glitches. Therefore, each of the embodiments will become increasingly effective means in the future.

Supplement to Embodiments

Figure 20:
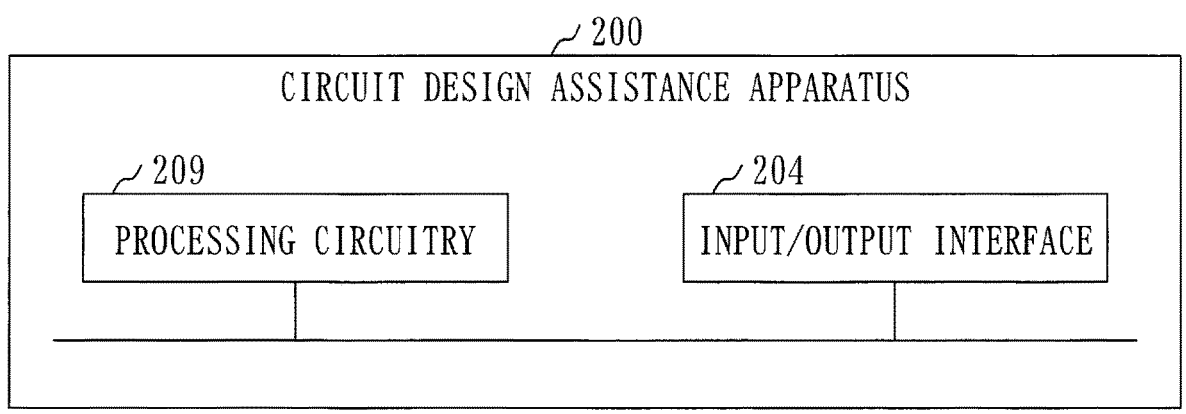
FIG. 20 is a hardware configuration diagram of the circuit design assistance apparatus 200 in the embodiments.

Based on FIG. 20, a hardware configuration of the circuit design assistance apparatus 200 will be described.

The circuit design assistance apparatus 200 includes processing circuitry 209.

The processing circuitry 209 is hardware that realizes the acceptance unit 210, the logic synthesis unit 220, the glitch removal unit 230, the adjustment unit 240, and the output unit 250.

The processing circuitry 209 may be dedicated hardware, or may be the processor 201 that executes programs stored in the memory 202.

When the processing circuitry 209 is the dedicated hardware, the processing circuitry 209 is, for example, a single circuit, a composite circuit, a programmed processor, a parallel-programmed processor, an ASIC, an FPGA, or a combination of these.

ASIC is an abbreviation for Application Specific Integrated Circuit, and FPGA is an abbreviation for Field Programmable Gate Array.

The circuit design assistance apparatus 200 may include a plurality of processing circuits as an alternative to the processing circuitry 209. The plurality of processing circuits share the role of the processing circuitry 209.

In the circuit design assistance apparatus 200, some of the functions may be realized by the dedicated hardware, and the rest of the functions may be realized by software or firmware.

As described above, the processing circuitry 209 may be realized by hardware, software, firmware, or a combination of these.

The embodiments are examples of preferred embodiments and are not intended to limit the technical scope of the present invention. Each of the embodiments may be implemented partially, or may be implemented in combination with another embodiment. The procedures described using flowcharts or the like may be suitably changed.

The circuit design assistance apparatus 200 may be realized with a plurality of apparatuses. That is, the circuit design assistance apparatus 200 may be realized as a system.

Each "unit" of the circuit design assistance apparatus 200 may be interpreted as "process" or "step".

"Logic synthesis" in the embodiments includes not only conventional logic synthesis, but also includes similar tools such as physical synthesis. Physical synthesis is an evolved version of logic synthesis.

REFERENCE SIGNS LIST

100: circuit design assistance system, 110: target circuit, 200: circuit design assistance apparatus, 201: processor, 202: memory, 203: auxiliary storage device, 204: input/output interface, 209: processing circuitry, 210: acceptance unit, 211: data acceptance unit, 212: specified number acceptance unit, 213: type information acceptance unit, 214: exclusion information acceptance unit, 220: logic synthesis unit, 230: glitch removal unit, 231: detection unit, 232: insertion unit, 240: adjustment unit, 241: checking unit, 242: cancellation unit, 243: improvement unit, 250: output unit, 290: storage unit, 291: design data, 292: constraint data, 293: synthesis result data

The invention claimed is:

1. A circuit design assistance system comprising:
   processing circuitry to:
   detect, based on synthesis result data obtained by logic synthesis on design data of a target circuit, a predicted place where a glitch is predicted to occur in the target circuit, and
   insert a glitch removal circuit in an output side of the predicted place by making a change to at least one of the synthesis result data and the design data,
   wherein a prescribed number is a number of 2 or more, and
   wherein the processing circuitry counts the number of applicable paths that do not pass through another flip-flop, among one or more paths to a combinational circuit from one or more flip-flops each being placed in a stage earlier than the combinational circuit, as the number of input signals of the combinational circuit, and detects a combinational circuit whose number of input signals is greater than or equal to the prescribed number as the predicted place.

2. The circuit design assistance system according to claim 1,
   wherein when another predicted place is detected in a stage earlier than the combinational circuit, the processing circuitry counts one or more applicable paths that pass through the another predicted place as one applicable path.

3. A non-transitory computer readable medium storing a circuit design assistance program for causing a computer to execute:
   a detection process of detecting, based on synthesis result data obtained by logic synthesis on design data of a target circuit, a predicted place where a glitch is predicted to occur in the target circuit; and
   an insertion process of inserting a glitch removal circuit in an output side of the predicted place by making a change to at least one of the synthesis result data and the design data,
   wherein a prescribed number is a number of 2 or more, and
   wherein the detection process counts the number of applicable paths that do not pass through another flip-flop, among one or more paths to a combinational circuit from one or more flip-flops each being placed in a stage earlier than the combinational circuit, as the number of input signals of the combinational circuit, and detects a combinational circuit whose number of input signals is greater than or equal to the prescribed number as the predicted place.

* * * * *